(12) United States Patent
Yabu

(10) Patent No.: US 7,201,013 B2
(45) Date of Patent: *Apr. 10, 2007

(54) AIR CONDITIONING APPARATUS

(75) Inventor: Tomohiro Yabu, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 463 days.

This patent is subject to a terminal disclaimer.

(21) Appl. No.: 10/475,534

(22) PCT Filed: Jul. 18, 2002

(86) PCT No.: PCT/JP02/07329

§ 371 (c)(1), (2), (4) Date: Oct. 22, 2003

(87) PCT Pub. No.: WO03/008872

PCT Pub. Date: Jan. 30, 2003

(65) Prior Publication Data

US 2004/0123615 A1 Jul. 1, 2004

(30) Foreign Application Priority Data

Jul. 18, 2001 (JP) .................................... 2001-218321

(51) Int. Cl.
F25D 23/00 (2006.01)
F25D 17/06 (2006.01)

(52) U.S. Cl. .................................. 62/271; 62/94; 62/93
(58) Field of Classification Search .................. 62/271, 62/93, 94
See application file for complete search history.

(56) References Cited

U.S. PATENT DOCUMENTS

| | | | |
|---|---|---|---|
| 5,517,828 A * | 5/1996 | Calton et al. ................. | 62/271 |
| 5,649,428 A * | 7/1997 | Calton et al. ................. | 62/94 |
| 5,771,707 A * | 6/1998 | Lagace et al. ................ | 62/271 |
| 5,817,167 A * | 10/1998 | DesChamps ................. | 95/113 |
| 6,361,588 B1 * | 3/2002 | Moratalla ...................... | 96/4 |
| 6,442,951 B1 * | 9/2002 | Maeda et al. ................. | 62/94 |
| 6,711,907 B2 * | 3/2004 | Dinnage et al. .............. | 62/94 |

FOREIGN PATENT DOCUMENTS

| | | |
|---|---|---|
| JP | 39434/1980 A | 3/1980 |
| JP | 05-033997 | 2/1993 |
| JP | 7-233966 A | 9/1995 |
| JP | 09-315128 | 12/1997 |
| JP | 10-205819 A | 8/1998 |
| JP | 11-208237 | 8/1999 |
| JP | 2000-111096 | 4/2000 |
| JP | 2000-257968 | 9/2000 |
| JP | 2001-46830 A | 2/2001 |

OTHER PUBLICATIONS

U.S. Appl. No. 10/475,534 to Yabu et al. Oct. 22, 2003, all pages, specifically claims 1–9.*
Partial English Translation of Laid Open unexamined Japanese Patent Application Publication No. 51-078048.

* cited by examiner

*Primary Examiner*—Denise L. Esquivel
*Assistant Examiner*—Filip Zec
(74) *Attorney, Agent, or Firm*—Birch, Stewart, Kolasch & Birch, LLP

(57) ABSTRACT

Disclosed is an air conditioning apparatus with two adsorption elements (81, 82). The air conditioning apparatus repeatedly alternately performs a first operation in which air is dehumidified by the first adsorption element (81) simultaneously with regeneration of the second adsorption element (82) and a second operation in which air is dehumidified by the second adsorption element (82) simultaneously with regeneration of the first adsorption element (81). At the time of switching between these operations, only the flow path of air is changed, with the adsorption elements (81, 82) remaining stationary. The air conditioning apparatus includes a refrigerant circuit. The refrigerant circuit performs a refrigeration cycle in which a regenerative heat exchanger (92) operates as a condenser and either one of first and second cooling heat exchangers (93, 94) operates as an evaporator. For example, air, which has robbed heat of adsorption in the first adsorption element (81), is further heated in the regenerative heat exchanger (92) and then introduced into the second adsorption element (82). Hereby, the second adsorption element (82) is regenerated.

17 Claims, 20 Drawing Sheets

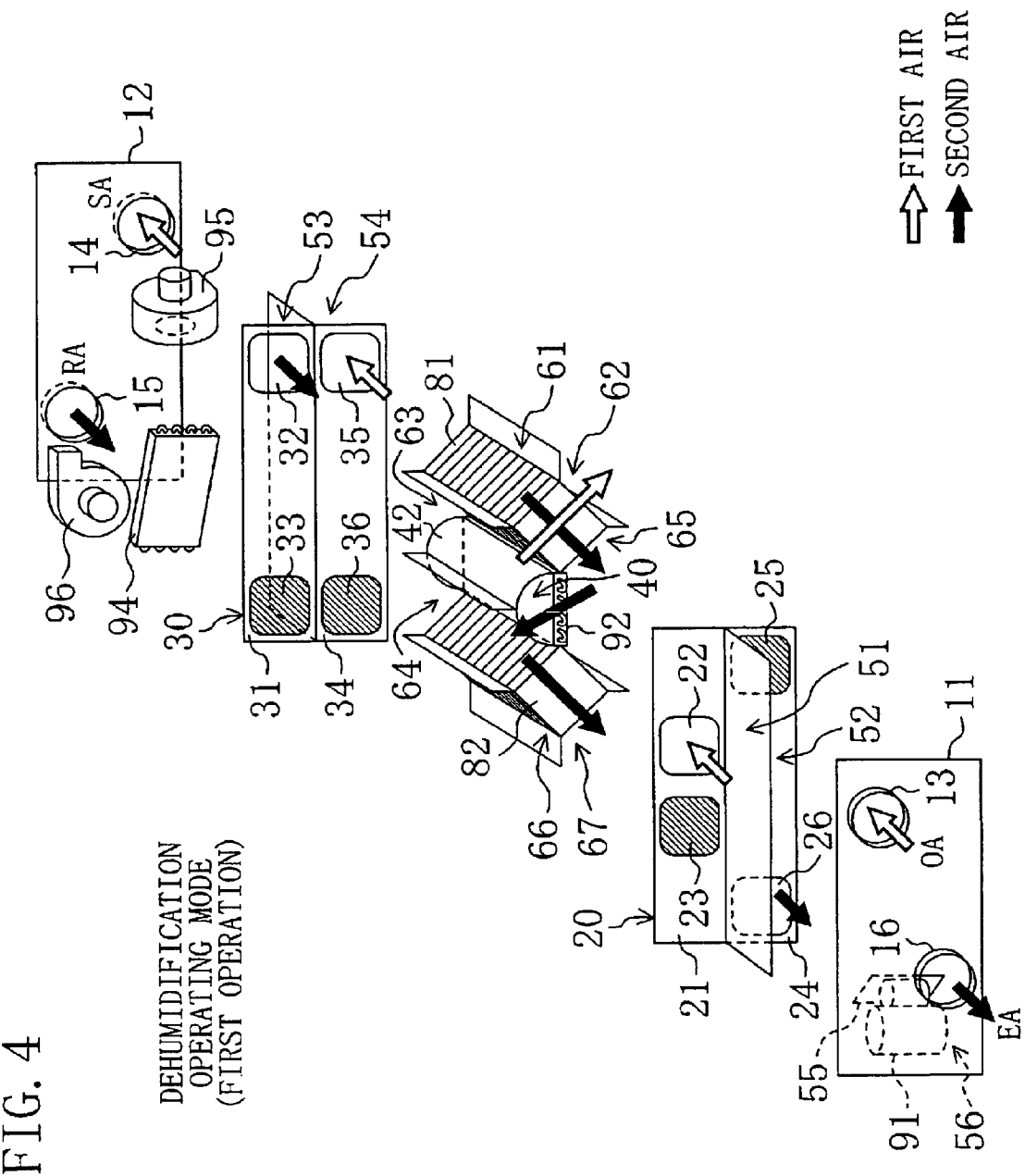

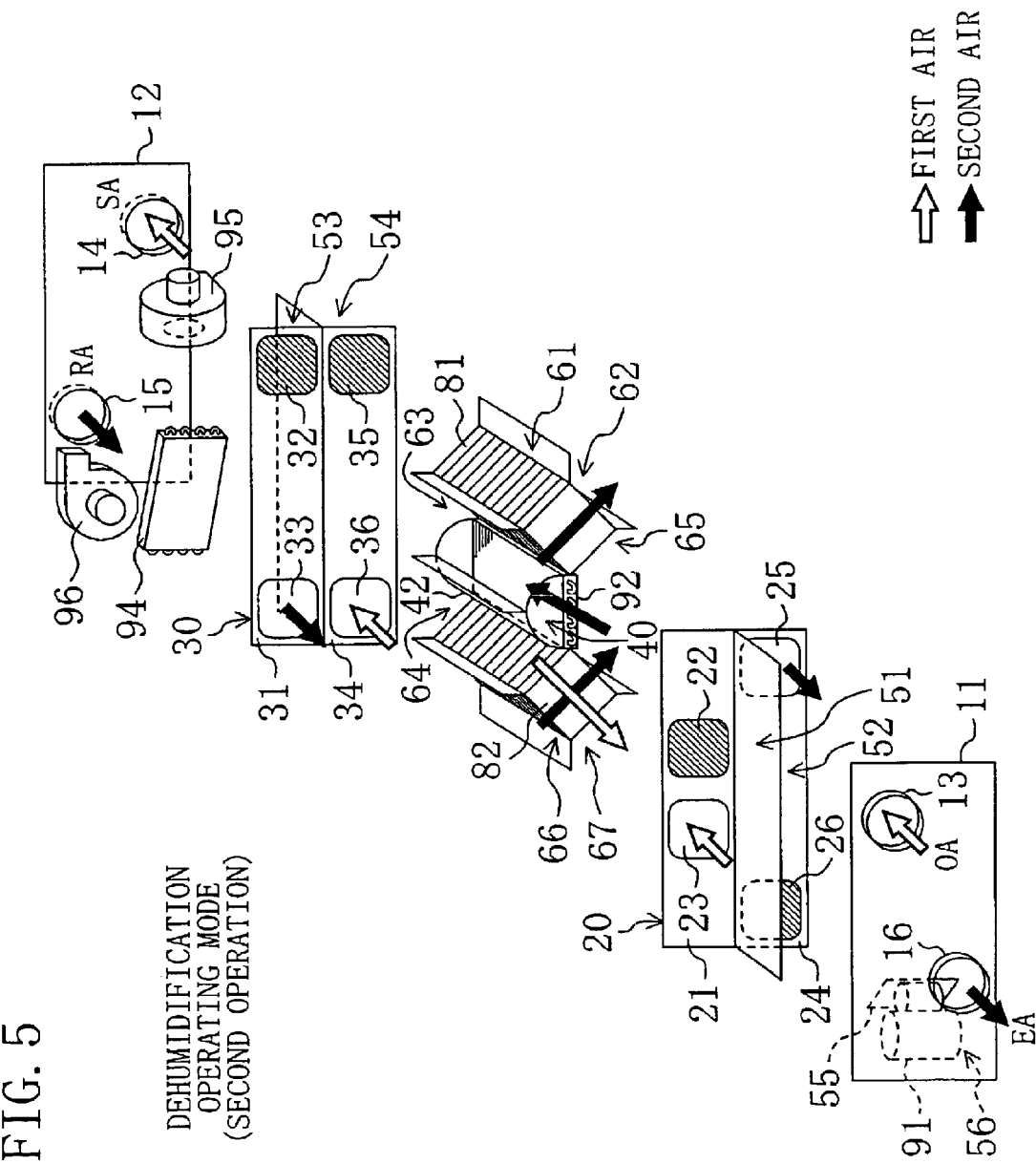

DEHUMIDIFICATION OPERATING MODE (FIRST OPERATION)

DEHUMIDIFICATION OPERATING MODE (SECOND OPERATION)

DEHUMIDIFICATION OPERATING MODE
(FIRST COOLING OPERATION)

DEHUMIDIFICATION
OPERATING MODE
(SECOND OPERATION)

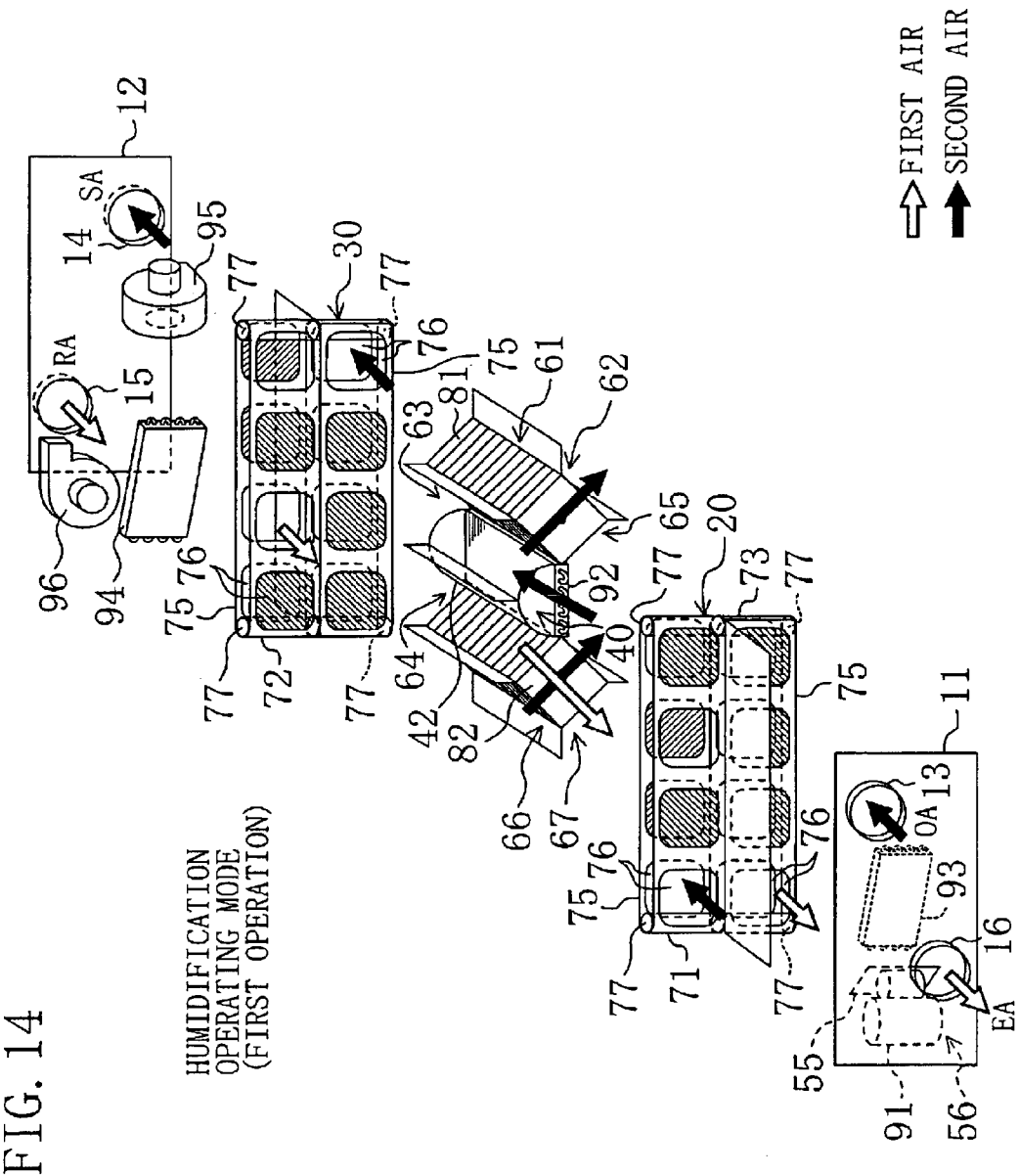

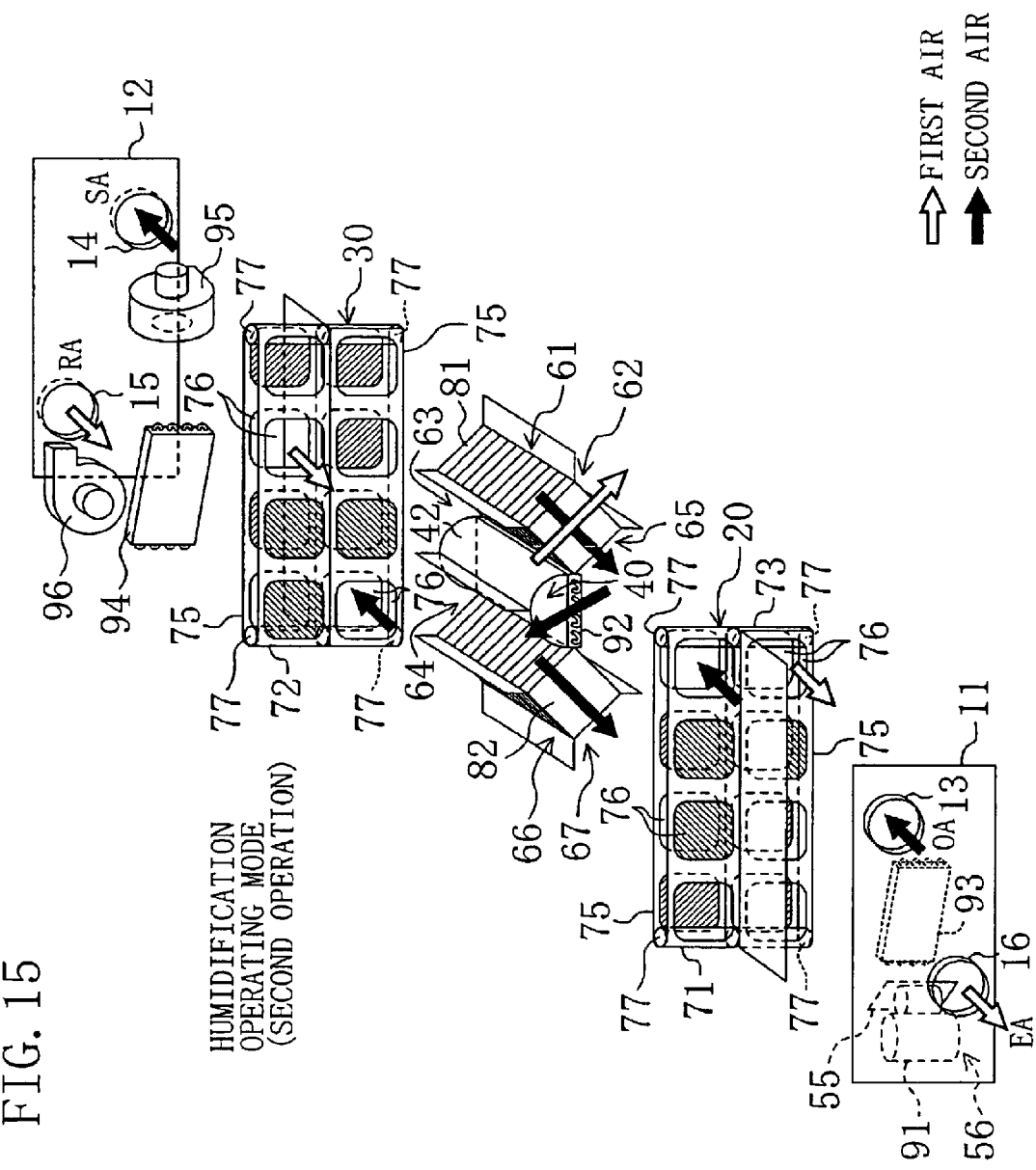

AIR CONDITIONING APPARATUS

This application is the national phase under 35 U.S.C. § 371 of PCT International Application No. PCT/JP02/07329 which has an International filing date of Jul. 18, 2002, which designated the United States of America.

BACKGROUND ART

The present invention relates generally to air conditioning apparatus and more particularly concerns an air conditioning apparatus capable of adjusting air humidity.

TECHNICAL FIELD

Air conditioning apparatus capable of air humidity adjustment have been known in the prior art. One such air conditioning apparatus is disclosed in Japanese Patent Kokai Gazette No. (2001)46830. A typical air conditioning apparatus of this type is provided with an adsorption element. Divisionally formed in the adsorption element are a large number of air passageways. Air flowing in such an air passageway comes into contact with an adsorbent. During the air dehumidification process, air to be processed is introduced into the air passageways of the adsorption element so that water vapor contained in the air is adsorbed into the adsorbent. On the other hand, during the air humidification process air to be processed is first heated by an electric heater and then introduced into the air passageways of the adsorbent so that water vapor desorbed from the adsorbent is provided to the air.

In the above-described air conditioning apparatus, it is necessary to regenerate the adsorption element by desorbing water vapor from the adsorbent not only in the air humidification process but also in the air dehumidification process. To this end, the air conditioning apparatus includes a first flow path through which air to be dehumidified flows and a second flow path through which air heated by the electric heater flows. And, the adsorption element is rotated to be switched between a first state in which the air passageways come into communication with the first flow path and a second state in which the air passageways come into communication with the second flow path, whereby air dehumidification by the adsorption element and regeneration of the adsorption element are performed in alternation.

Problems that Invention Intends to Solve

However, the employment of such a construction that the adsorption element is rotated gives rise to air leakage between each flow path formed in the air conditioning apparatus, and the performance of the air conditioning apparatus is degraded due to mixing of air to be dehumidified and air for regeneration or the like. Additionally, the provision of a mechanism for rotating the adsorption element is required. This produces a problem that air conditioning apparatus become complicated in construction, thereby increasing the cost of production thereof. Especially, when trying to increase the size of an adsorption element in order to increase the amount of processable air, the weight of the adsorption element also increases, and the foregoing problem becomes significant.

Further, in the above-described air conditioning apparatus the air used for regenerating the adsorption element is heated by the electric heater. This produces another problem that only energy efficiency at low levels is obtained. In other words, when air is heated by an electric heater, the amount of heating with respect to the air will never exceed the power consumption of the electric heater in any circumstances. Because of this, theoretically the power of adjusting humidity of the air conditioning apparatus will never exceed the power consumption thereof in any circumstances. Accordingly, it is impossible for the air conditioning apparatus to provide humidity adjusting power in excess of the energy consumption thereof, and the fact that the energy efficiency is low produces another problem of running up the cost of energy necessary for the operations of the air conditioning apparatus.

Bearing in mind the foregoing problems, the present invention was made. Accordingly, an object of the present invention is to provide solutions to problems due to the rotation of an adsorption element of an air conditioning apparatus capable of air humidity adjustment and to improve the energy efficiency of the air conditioning apparatus.

Disclosure of Invention

The present invention provides a first problem-solving means which is directed to an air conditioning apparatus comprising rectangular-parallelepiped-shaped adsorption elements (81, 82) in each of which are formed a humidity adjusting side passageway (85) where air flowing therethrough comes into contact with an adsorbent and a cooling side passageway (86) through which air flows to take heat of adsorption from the humidity adjusting side passageway (85). The air conditioning apparatus performs, in alternation, a first operation in which air is dehumidified in the first adsorption element (81) simultaneously with regeneration of the second adsorption element (82) and a second operation in which air is dehumidified in the second adsorption element (82) simultaneously with regeneration of the first adsorption element (81) and further performs at least a dehumidification operating mode in which air taken in is dehumidified and then supplied indoors. The air conditioning apparatus further comprises a refrigerant circuit in which a refrigerant is circulated to perform a refrigeration cycle and air for regeneration of the adsorption elements (81, 82) is heated by heat of condensation of the refrigerant, and a flow path changing means capable of changing the flow route of air with the adsorption elements (81, 82) remaining fixed in position for switching between the first operation and the second operation, and a condenser (92) of the refrigerant circuit is disposed between the first and second adsorption elements (81, 82) which are disposed side by side.

The present invention provides a second problem-solving means according to the first problem-solving means. The second problem-solving means is characterized in that in each of the first and second adsorption elements (81, 82) the humidity adjusting side passageway (85) is opened in one of two adjoining side surfaces thereof and the cooling side passageway (86) is opened in the other side surface, and that the first and second adsorption elements (81, 82) having end surfaces in which neither the humidity adjusting side passageway (85) nor the cooling side passageway (86) is opened are disposed in such orientation that one of end-surface diagonal lines of the first adsorption element (81) becomes collinear with one of end-surface diagonal lines of the second adsorption element (82).

The present invention provides a third problem-solving means according to the second problem-solving means. The third problem-solving means is characterized in that the condenser (92) of the refrigerant circuit is so disposed as to be offset from a straight line that links centers of the end surfaces of the adsorption elements (81, 82).

The present invention provides a fourth problem-solving means according to the first or second problem-solving means. The fourth problem-solving means is characterized in that it further comprises an operating mode switching means capable of changing the flow route of air with the adsorption elements (81, 82) remaining fixed in position for switching from a humidification operating mode in which air taken in is humidified and then supplied indoors to a dehumidification operating mode.

The present invention provides a fifth problem-solving means according to the first or second problem-solving means. The fifth problem-solving means is characterized in that it further comprises an operating mode switching means capable of changing the flow route of air with the adsorption elements (81, 82) remaining fixed in position for switching from an outside air introducing operating mode in which air taken in is supplied indoors without dehumidification and humidification to a dehumidification operating mode.

The present invention provides a sixth problem-solving means according to the first or second problem-solving means. The sixth problem-solving means is characterized in that, at the time of switching between the first operation and the second operation, in advance of the start of air dehumidification by the regenerated adsorption element (81, 82) a cooling operation is performed in which air is forced to flow through the cooling side passageway (86) of the adsorption element (81, 82) so that the adsorption elements (81, 82) is cooled.

The present invention provides a seventh problem-solving means according to any one of the fourth to sixth problem-solving means. The seventh problem-solving means is characterized in that it further comprises first switching mechanism (71, 72, ...), comprising a strip-like member (75) provided with an opening portion (76) for the passage of air and disposed in such orientation as to cross an air flow path and a pair of roller members (77) about which the strip-like member (75) is passed, for changing the flow route of air by rotation of the roller members (77) causing the position of the opening portion (76) of the strip-like member (75) to move, and a second switching mechanism (40) for changing the flow route of air such that air flowing out from the cooling side passageway (86) of the first adsorption element (81) passes through the condenser (92) and is introduced into the humidity adjusting side passageway (85) of the second adsorption element (82) in the first operation and air flowing out from the cooling side passageway (86) of the second adsorption element (82) passes through the condenser (92) and is introduced into the humidity adjusting side passageway (85) of the first adsorption element (81) in the second operation, wherein the first switching mechanism (71, 72, ...) and the second switching mechanism (40) serve both as flow path changing means and operating mode switching means.

The present invention provides an eighth problem-solving means according to the seventh problem-solving means. The eighth problem-solving means is characterized in that the second switching mechanism (40) prevents air from flowing into the cooling side passageway (86) of the second adsorption element (82) during the first operation and prevents air from flowing into the cooling side passageway (86) of the first adsorption element (81) during the second operation.

Working

In the first problem-solving means, the air conditioning apparatus repeatedly alternately performs the first operation and the second operation. The flow path changing means changes the flow route of air so that the air conditioning apparatus is switched between the first operation and the second operation. At the time of such switching, each adsorption element (81, 82) is held in the fixed state, in other words they are not rotated. In the first operation, air subjected to dehumidification is introduced into the humidity adjusting side passageway (85) of the first adsorption element (81), and air for regeneration is introduced into the humidity adjusting side passageway (85) of the second adsorption element (82). On the other hand, in the second operation air subjected to dehumidification is introduced into the humidity adjusting side passageway (85) of the second adsorption element (82), and air for regeneration is introduced into the humidity adjusting side passageway (85) of the first adsorption element (81).

Regeneration air which is supplied to each adsorption element (81, 82) is heated by heat exchange with refrigerant in the condenser (92) of the refrigerant circuit. The condenser (92) is interposed between the first adsorption element (81) and the second adsorption element (82), whereby the regeneration air, after passing through the condenser (92), is allowed to smoothly flow into the humidity adjusting side passageway (85) of each adsorption element (81, 82).

Additionally, in the first and second operations air for cooling is introduced into the cooling side passageway (86) of each adsorption element (81, 82). The heat of adsorption of water vapor produced in the humidity adjusting side passageway (85) is taken by air flowing in the cooling side passageway (86). The air, which has absorbed heat of adsorption in the cooling side passageway (86), may be used for regeneration.

In the second problem-solving means, in each of the rectangular-parallelepiped-shaped adsorption elements (81, 82) the humidity adjusting side passageway (85) is opened in two opposing side surfaces of the four side surfaces and the cooling side passageway (86) is opened in the remaining two opposing side surfaces. Stated another way, in each of the adsorption elements (81, 82) the direction in which air flows in the humidity adjusting side passageway (85) is orthogonal to the direction in which air flows in the cooling side passageway (86). Additionally, in the rectangular-parallelepiped-shaped adsorption elements (81, 82) neither the humidity adjusting side passageway (85) nor the cooling side passageway (86) is opened in their end surfaces. And, the first adsorption element (81) and the second adsorption element (82) are disposed in such orientation that one of end surface's diagonal lines of each adsorption element (81, 82) becomes collinear with one of end surface's diagonal lines of the other adsorption element.

In the third problem-solving means, the condenser (92) of the refrigerant circuit is so disposed as to be offset from a straight line that links centers of the end surfaces of the first and second adsorption elements (81, 82). In other words, the condenser (92) of the refrigerant circuit is so disposed at a predetermined distance apart from a straight line collinear with one of the end surface's diagonal lines of each adsorption element (81, 82).

In the fourth problem-solving means, the operation of the air conditioning apparatus is switched between dehumidification operating mode and humidification operating mode. During the humidification operating mode, water vapor desorbed from the adsorption elements (81, 82) is utilized to humidify air. In the present problem-solving means, the operating mode switching means performs switching between these operating modes by changing the flow route of air. During that period, the adsorption elements (81, 82) are not rotated, in other words they are held in the fixed state.

In the fifth problem-solving means, the operation of the air conditioning apparatus is switched between dehumidification operating mode and outside air introducing operating mode. During the outside air introducing operating mode, outdoor air taken in is supplied indoors directly without being adjusted in humidity. The outside air introducing operating mode is performed for example in a so-called intermediate season in which the temperature of outside air is lower than room temperature. In the present problem-solving means, the operating mode switching means performs switching between these operating modes by changing the flow route of air. During that period, the adsorption elements (81, 82) are not rotated, in other words they are held in the fixed state. Additionally, it may be arranged such that the air conditioning apparatus of the present problem-solving means is switched among three operating modes, i.e., dehumidification, humidification, and outside air introducing operating modes.

In the sixth problem-solving means, the air conditioning apparatus performs a cooling operation. In the air conditioning apparatus of the present problem-solving means, upon completion of a first operation a cooling operation is carried out. Thereafter, a second operation starts. Likewise, upon completion of the second operation a cooling operation is carried out. Thereafter, another first operation starts. In other words, switching between a first operation and a second operation is always made through a cooling operation in the present problem-solving means.

For example, upon completion of a first operation air is introduced into the cooling side passageway (86) of the second adsorption element (82). The second adsorption element (82) regenerated in the first operation is cooled by air flowing through the cooling side passageway (86). This is followed by the start of a second operation, and air dehumidification is carried out using the second adsorption element (82) regenerated in the first operation and cooled by the cooling operation.

In the seventh problem-solving means, the air conditioning apparatus is provided with the first switching mechanisms (71, 72, . . . ) and the second switching mechanism (40). The first switching mechanisms (71, 72, . . . ) and the second switching mechanism (40) serve both as a flow path changing means and an operating mode switching means. In other words, when the first switching mechanisms (71, 72, . . . ) and the second switching mechanism (40) are operated the flow route of air is changed, whereby the air conditioning apparatus is switched between the first operation and the second operation. Furthermore, when the first switching mechanisms (71, 72, . . . ) and the second switching mechanism (40) are operated the flow route of air is changed, whereby the air conditioning apparatus is switched between the humidification operating mode and the dehumidification operating mode or between the outside air introducing operating mode and the dehumidification operating mode.

The first switching mechanisms (71, 72, . . . ) are each provided with the strip-like member (75) and the roller members (77). The opening portion (76) for the passage of air is formed in the strip-like member (75). Additionally, the strip-like member (75) is disposed in such orientation that it crosses an air flow path in the air conditioning apparatus. When the roller members (77) around which the strip-like member (75) is passed are rotated, the strip-like member (75) moves and, therefore, the position of the opening portion (76) changes. In this way, the flow route of air is changed with the movement of the opening portion (76) of the strip-like member (75).

The second switching mechanism (40) changes the flow route of air flowing out from the cooling side passageway (86) of the adsorption element (81, 82). In other words, the second switching mechanism (40) guides to the condenser (92) of the refrigerant circuit air heated in the cooling side passageway (86) of one of the adsorption elements (81, 82) in the first or second operation. After being heated, the air is introduced into the humidity adjusting side passageway (85) of the other of the adsorption elements (81, 82) as air for regeneration.

In the eighth problem-solving means, the second switching mechanism (40) performs predetermined operations. More specifically, the second switching mechanism (40) executes an operation of changing the flow route of air flowing out from the cooling side passageway (86) of the adsorption element (81, 82) that performs air dehumidification. In addition, the second switching mechanism (40) performs an operation of preventing air from flowing into the cooling side passageway (86) of the adsorption element (81, 82) that is being regenerated.

Effects

The air conditioning apparatus of the present invention capable of performing humidity adjustment by the use of the adsorption elements (81, 82) is switched between the first operation and the second operation without rotations of the adsorption elements (81, 82). Therefore, in accordance with the present invention, it is possible to prevent the occurrence of air leakage accompanied with the movement of the adsorption elements (81, 82), thereby preventing the performance of the air conditioning apparatus from degrading due to air leakage. Additionally, the need for the provision of a mechanism for rotating the adsorption elements (81, 82) is eliminated, thereby simplifying the construction of air conditioning apparatus and reducing the cost of production thereof.

Furthermore, in the present invention air for regeneration of the adsorption elements (81, 82) is heated by heat exchange with refrigerant in the condenser (92) of the refrigerant circuit. When performing a refrigeration cycle by circulation of refrigerant in the refrigerant circuit, the amount of heat that is given to the air in the condenser (92) becomes greater than the energy required for driving the compressor of the refrigerant circuit. Therefore, in the present invention air for regeneration is heated by the refrigeration cycle of the refrigerant circuit, thereby making it possible to obtain dehumidification power in excess of the consumption energy of the compressor. As the result of this, it becomes possible to improve the energy efficiency of an air conditioning apparatus capable of adjusting air humidity and to reduce the cost of energy required for the operation thereof.

Furthermore, in accordance with the third problem-solving means it becomes possible to employ such an arrangement that each adsorption element (81, 82) and the condenser (92) are partially overlapped when viewed from the end surface side of each adsorption element (81, 82). Accordingly, the present problem-solving means makes it possible to provide a down-sized air conditioning apparatus.

In the sixth problem-solving means, the adsorption element (81, 82) regenerated is cooled by a cooling operation and air subjected to dehumidification is introduced into that cooled adsorption element (81, 82). If air subjected to dehumidification is introduced into the adsorption element (81, 82) regenerated and heated to high temperature, then the air is heated in the humidity adjusting side passageway (85) of that heated adsorption element (81, 82). Consequently, the relative humidity of the air falls to a lower level, thereby resulting in a drop in the amount of water vapor to be adsorbed into the adsorbent. Contrary to this, in the present problem-solving means the adsorption element (81, 82) is pre-cooled by a cooling operation and, thereafter, air subjected to dehumidification is supplied to that pre-heated adsorption element (81, 82). Therefore, in accordance with the present problem-solving means it is possible to allow the adsorption element (81, 82) to exhibit sufficient adsorption performance, thereby improving the performance of the air conditioning apparatus.

In the eighth problem-solving means, the second switching mechanism (40) performs specified operations so that air will not flow into the adsorption element (81, 82) that is being regenerated. This ensures that the adsorption element (81, 82) to be generated is heated by regeneration air, and that water vapor is desorbed from the adsorbent of the adsorption element (81, 82). The present problem-solving means ensures that each adsorption element (81, 82) is regenerated, thereby improving the performance of the air conditioning apparatus.

BRIEF DESCRIPTION OF DRAWINGS

FIG. 4 is an exploded perspective view describing a first operation in the dehumidification operating mode of the air conditioning apparatus according to the first embodiment;

FIG. 5 is an exploded perspective view describing a second operation in the dehumidification operating mode of the air conditioning apparatus according to the first embodiment;

FIG. 14 is an exploded perspective view describing a first operation in the humidification operating mode of the air conditioning apparatus according to the third embodiment;

FIG. 15 is an exploded perspective view describing a second operation in the humidification operating mode of the air conditioning apparatus according to the third embodiment;

BEST MODE FOR CARRYING OUT INVENTION

Figure 1:
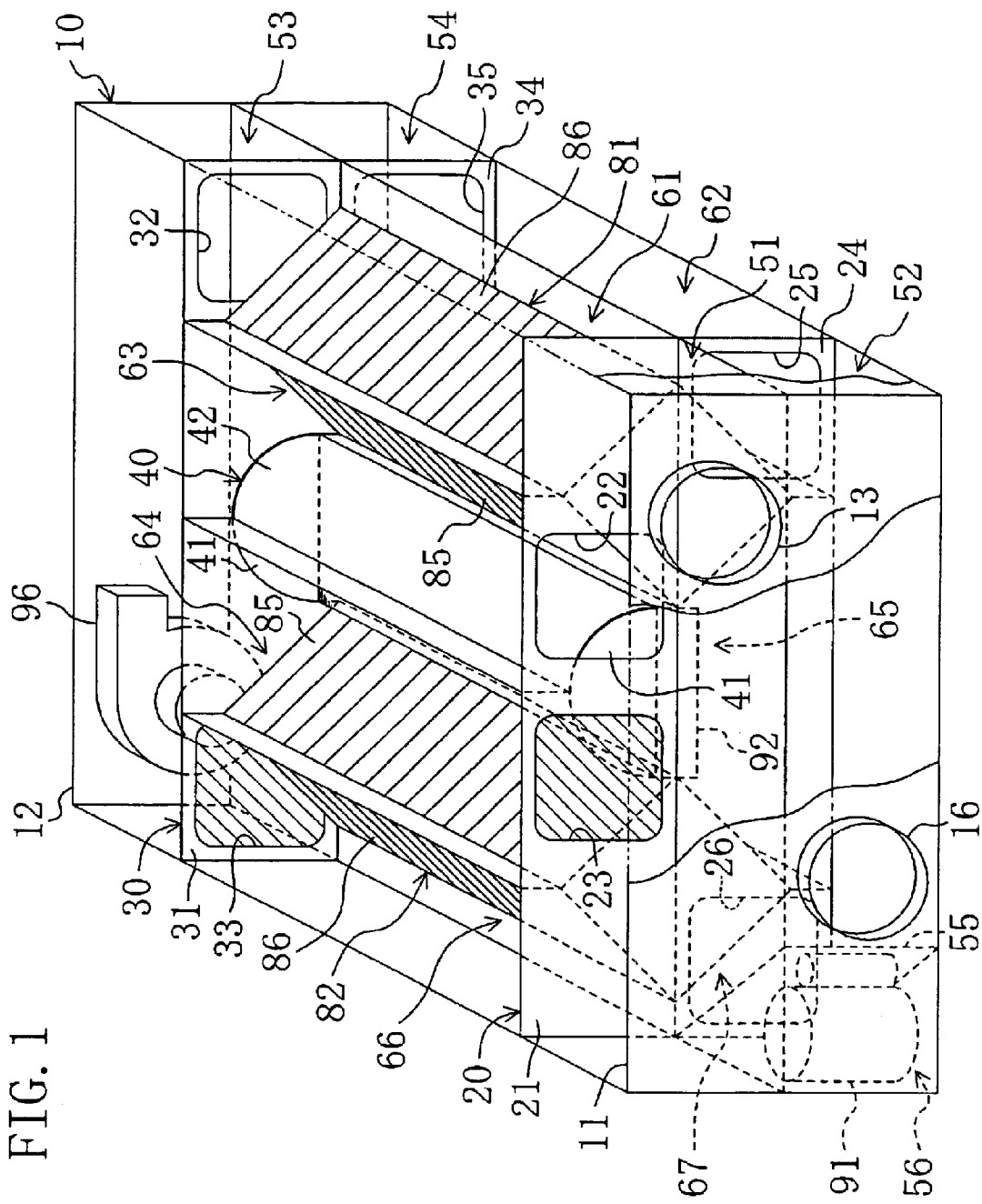
FIG. 1 is a schematic perspective view showing an arrangement of an air conditioning apparatus according to a first embodiment of the present invention.

Hereinafter, embodiments of the present invention will be described in detail with reference to the drawings. In addition, the positional terms "upper", "lower", "left", "right", "front", "rear", "front side (near side)", and 'rear side (far side)" mean "upper", "lower", "left", "right", "front", "rear", "front side (near side)", and 'rear side (far side)" positions respectively in the drawings referred to in the following description.

First Embodiment of Invention

An air conditioning apparatus according to a first embodiment of the present invention is so constructed as to perform only a dehumidification operating mode in which outside air taken in is dehumidified and then supplied indoors. Furthermore, the air conditioning apparatus of the first embodiment is provided with two adsorption elements (81, 82) and is so constructed as to perform a so-called batch system operation. Here, an arrangement of the air conditioning apparatus of the first embodiment will be described with reference to FIGS. 1–4.

As shown in FIGS. 1 and 4, the air conditioning apparatus has a somewhat flat, rectangular-parallelepiped-shaped casing (10). The casing (10) houses, in addition to the two adsorption elements (81, 82), a single refrigerant circuit.

Figure 2:
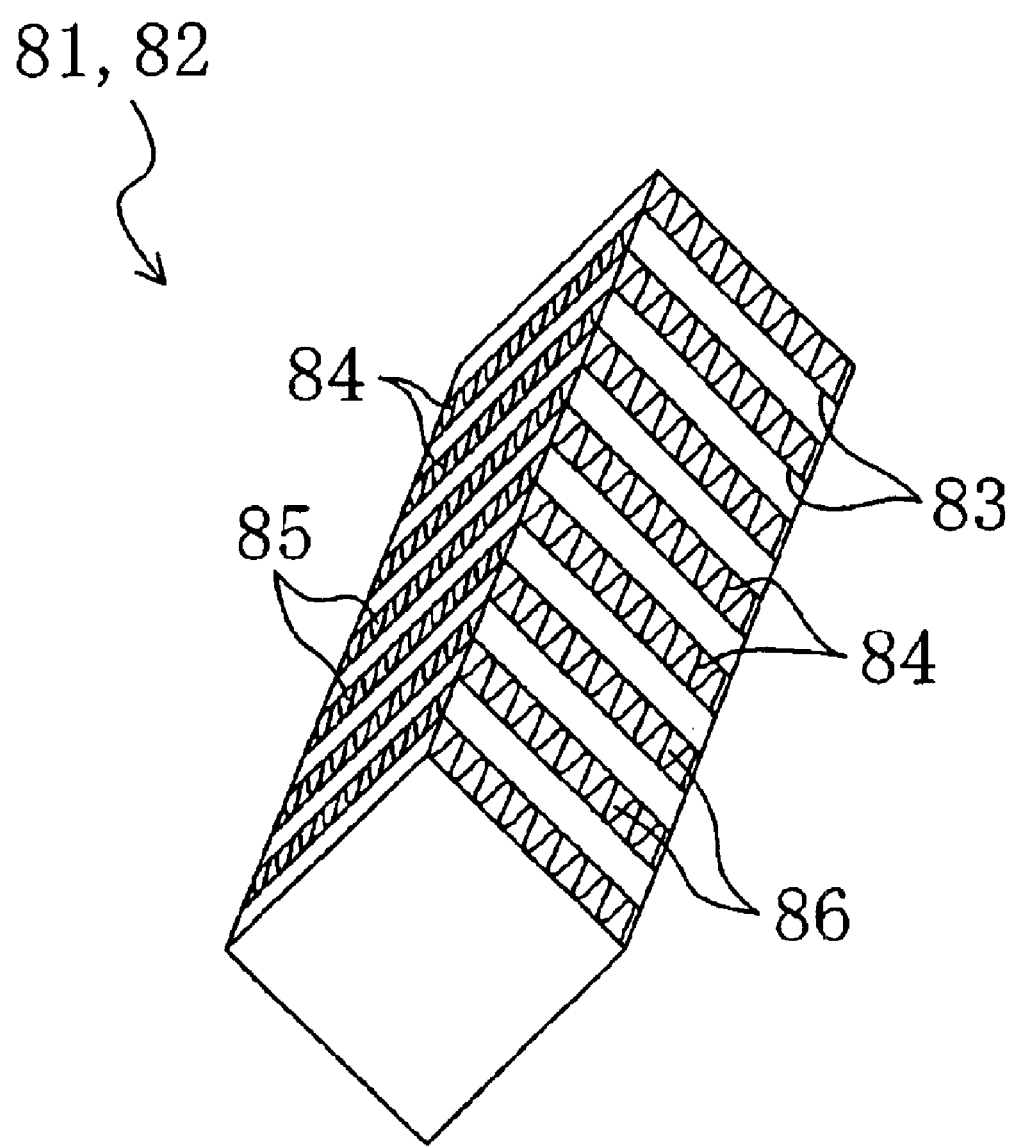
FIG. 2 is a schematic perspective view showing an adsorption element of the air conditioning apparatus according to the first embodiment.

As shown in FIG. 2, the adsorption element (81, 82) comprises alternating laminations of square-shaped flat plate members (83) and corrugated plate members (84). These corrugated plate members (84) are laminated in such orientation that each corrugated plate member (84) is out of alignment in ridgeline direction by an angle of 90 degrees from its neighboring corrugated plate member (84). And, the adsorption element (81, 82) is formed into a square column shape or into a rectangular parallelepiped shape. In other words, each of end surfaces of the adsorption element (81, 82) is formed into the same square shape as the flat plate member (83).

In the adsorption element (81, 82), humidity adjusting side passageways (85) and cooling side passageways (86) are divisionally formed in alternation in the direction in which the flat plate members (83) and the corrugated plate members (84) are laminated, facing each other across the respective flat plate members (83). The humidity adjusting side passageway (85) opens in a pair of opposite side surfaces of the four side surfaces of the adsorption element (81, 82), while the cooling side passageway (86) opens in another pair of opposite side surfaces of the adsorption element (81, 82). Additionally, neither the humidity adjusting side passageway (85) nor the cooling side passageway (86) opens in the end surfaces of the adsorption element (81, 82). Surfaces of the flat plate members (83) that face the humidity adjusting side passageways (85) and surfaces of the corrugated plate members (84) disposed in the humidity adjusting side passageways (85) are coated with an adsorbent capable of adsorbing water vapor. As the adsorbent, silica gel, zeolite, ion exchange resin, et cetera may be used.

The refrigerant circuit mentioned above is a closed circuit formed by connecting together, by piping, a compressor (91), a regenerative heat exchanger (92) which operates as a condenser, a refrigerant expansion valve, and a cooling heat exchanger (94) which operates as an evaporator in sequence. Diagrammatic representation of the entire arrangement of the refrigerant circuit and the expansion valve is omitted. The refrigerant circuit is so constructed as to perform a vapor compression refrigeration cycle by circulating charged refrigerant.

As shown in FIGS. 1 and 4, the casing (10) is provided with an outdoor-side panel (11) which is a nearest side panel, and an indoor side panel (12) which is a farthest side panel. An air supply side inlet (13) is formed in an upper-right corner of the outdoor-side panel (11). An air discharge side outlet (16) is formed to the bottom left of the outdoor-side panel (11). On the other hand, an air supply side outlet (14) is formed in a lower-right corner of the indoor side panel (12), and an air discharge side inlet (15) is formed in an upper-left corner of the indoor side panel (12).

Housed in the casing (10) are two partition members (20, 30). The partition members (20, 30) are each formed into substantially the same rectangular shape as the shape of a cross section of the casing (10) orthogonal to the longitudinal direction (front-rear direction) thereof. The partition members (20, 30) are standingly arranged in that order from near to far side, so that the interior space of the casing (10) is partitioned front-to-rear. In addition, each of these internal spaces of the casing (10) divided by the partition members (20, 30) is further divided into upper and lower spaces.

Divisionally formed between the outdoor-side panel (11) and the first partition member (20) are an upper-situated, outdoor-side upper flow path (51) and a lower-situated, outdoor-side lower flow path (52). The outdoor-side upper flow path (51) communicates with an outdoor space through the air supply side inlet (13). The outdoor-side lower flow path (52) communicates with an outdoor space through the air discharge side outlet (16). Defined by a compartment plate (55) at the near side of a left end of the outdoor-side lower flow path (52) is a closed space serving as a machine room (56). This machine room (56) houses a compressor (91) of the refrigerant circuit.

The two adsorption elements (81, 82) are arranged side by side in a lateral row between the first partition member (20) and the second partition member (30). More specifically, the first adsorption element (81) is disposed to the right and the second adsorption element (82) is disposed to the left. These adsorption elements (81, 82) are arranged in parallel in such orientation that their respective longitudinal directions correspond to the longitudinal direction of the casing (10). In addition, as shown in FIG. 3, the adsorption elements (81, 82) are disposed in such orientation that their end surfaces each form a rhombic shape such as a square shape rotated an angle of 45 degrees. In other words, the adsorption elements (81, 82) are arranged in such orientation that one end-surface diagonal line of the adsorption element (81) is collinear with its corresponding end-surface diagonal line of the adsorption element (82).

Furthermore, the regenerative heat exchanger (92) of the refrigerant circuit and a switch shutter (40) are disposed between the first partition member (20) and the second partition member (30). The regenerative heat exchanger (92) is shaped like a flat plate. The rear-to-front length of the regenerative heat exchanger (92) is substantially the same as the rear-to-front length of the adsorption elements (81, 82). The regenerative heat exchanger (92) is disposed substantially horizontally between the first adsorption element (81) and the second adsorption element (82). Additionally, the regenerative heat exchanger (92) is disposed on a straight line that links together an end surface center of the first adsorption element (81) and an end surface center of the second adsorption element (82). And, air flows in a vertical direction through the regenerative heat exchanger (92).

The switch shutter (40), comprised of a shutter plate (42) and a pair of side plates (41), constitutes a second switching mechanism. Each of the side plates (41) is shaped like a semicircular plate. The diameter of each side plate (41) is substantially the same as the right-to-left width of the regenerative heat exchanger (92). The side plates (41) are disposed along near- and far-side end surfaces of the regenerative heat exchanger (92), respectively. On the other hand, the shutter plate (42) extends from one of the side plates (41) to the other side plate (41). The shutter plate (42) is shaped like a curved plate curbing along a peripheral edge of each side plate (41). The center angle of the curbed surface of the shutter plate (42) is 90 degrees. The shutter plate (42) covers a horizontal half of the regenerative heat exchanger (92). Furthermore, the shutter plate (42) is so constructed as to move along a peripheral edge of the side plate (41). And, the switch shutter (40) is switched between a, first state in which the shutter plate (42) covers a right half of the regenerative heat exchanger (92) (see FIG. 3(*a*)) and a second state in which the shutter plate (42) covers a left half of the regenerative heat exchanger (92) (see FIG. 3(*b*)).

The space between the first partition member (20) and the second partition member (30) is divided into an upper space and a lower space. Each of the upper and lower spaces is divided, by the first and second adsorption elements (81, 82) and the switch shutter (40), into a left section and a right section. More specifically, divisionally formed on the right side of the first adsorption element (81) are an upper-situated, upper-right flow path (61) and a lower-situated, lower-right flow path (62). Divisionally formed above between the first adsorption element (81) and the second adsorption element (82) are a first upper-central flow path (63) on the right side of the switch shutter (40) and a second upper-central flow path (64) on the left side of the switch shutter (40). Divisionally formed below between the first adsorption element (81) and the second adsorption element (82) is a lower-central flow path (65). Divisionally formed on the left side of the second adsorption element (82) are an upper-situated, upper-left flow path (66) and a lower-situated, lower-left flow path (67).

As has been described above, each adsorption element (81, 82) is provided with the humidity adjusting side passageway (85) and the cooling side passageway (86). And, the first adsorption element (81) is disposed in such orientation that the humidity adjusting side passageway (85) communicates with the first upper-central flow path (63) as well as with the lower-right flow path (62), and the cooling side passageway (86) communicates with the upper-right flow path (61) as well as with the lower-central flow path (65). On the other hand, the second adsorption element (82) is disposed in such orientation that the humidity adjusting side passageway (85) communicates with the second upper-central flow path (64) as well as with the lower-left flow path (67), and the cooling side passageway (86) communicates with the upper-left flow path (66) as well as with the lower-central flow path (65).

Divisionally formed between the second partition member (30) and the indoor side panel (12) are an upper-situated, indoor-side upper flow path (53) and a lower-situated, indoor-side lower flow path (54). The indoor-side upper flow path (53) is brought into communication with an indoor space through the air discharge side inlet (15). The indoor-side upper flow path (53) is provided with an air discharge fan (96). On the other hand, the indoor-side lower flow path (54) is brought into communication with an indoor space through the air supply side outlet (14). The indoor-side lower flow path (54) is provided with an air supply fan (95) and a cooling heat exchanger (94).

An upper half portion of the first partition member (20) is formed by a first upper plate (21) and the remaining lower half portion is formed by a first lower plate (24). The first upper and lower plates (21, 24) are each provided with two openings of square shape.

When assuming that the first upper plate (21) is divided into four equal sections in a right-to-left width direction, the two openings (22, 23) of the first upper plate (21) are formed in two centrally located sections of the first upper plate (21), respectively. And, of these two openings (22, 23) the one on the right side constitutes a first central upper-right opening (22) and the other on the left side constitutes a first central upper-left opening (23).

Each of the openings (22, 23) of the first upper plate (21) is switchable between a first state in which the first central upper-right opening (22) is opened and the first central upper-left opening (23) is closed, and a second state in which the first central upper-right opening (22) is closed and the first central upper-left opening (23) is opened. When the first central upper-right opening (22) is placed in the open state, the outdoor-side upper flow path (51) and the first upper-central flow path (63) are brought into communication with each other by the first central upper-right opening (22). On the other hand, when the first central upper-left opening (23) is placed in the open state, the outdoor-side upper flow path (51) and the second upper-central flow path (64) are brought into communication with each other by the first central upper-left opening (23).

When assuming that the first lower plate (24) is divided into four equal sections in a right-to-left width direction, the two openings (25, 26) of the first lower plate (24) are formed in right and left end sections of the first lower plate (24), respectively. And, of these two openings (25, 26) the one on the right end side constitutes a first lower-right opening (25) and the other on the left end side constitutes a first lower-left opening (26).

Each of the openings (25, 26) of the first lower plate (24) is switchable between a first state in which the first lower-right opening (25) is opened and the first lower-left opening (26) is closed, and a second state in which the first lower-right opening (25) is closed and the first lower-left opening (26) is opened. When the first lower-right opening (25) is placed in the open state, the lower-right flow path (62) and the outdoor-side lower flow path (52) are brought into communication with each other by the first lower-right opening (25). On the other hand, when the first lower-left opening (26) is placed in the open state, the lower-left flow path (67) and the outdoor-side lower flow path (52) are brought into communication with each other by the first lower-left opening (26).

An upper half portion of the second partition member (30) is formed by a second upper plate (31) and the remaining lower half portion thereof is formed by a second lower plate (34). The second upper and lower plates (31, 34) are each provided with two openings of square shape.

When assuming that the second upper plate (31) is divided into four equal sections in a right-to-left width direction, the two openings (32, 33) of the second upper plate (31) are formed in right and left end sections of the second upper plate (31), respectively. And, of these two openings (32, 33) the one on the right side constitutes a second upper-right opening (32) and the other on the left side constitutes a second upper-left opening (33).

Each of the openings (32, 33) of the second upper plate (31) is switchable between a first state in which the second upper-right opening (32) is opened and the second upper-left opening (33) is closed, and a second state in which the second upper-right opening (32) is closed and the second upper-left opening (33) is opened. When the second upper-right opening (32) is placed in the open state, the upper-right flow path (61) and the indoor-side upper flow path (53) are brought into communication with each other by the second upper-right opening (32). On the other hand, when the second upper-left opening (33) is placed in the open state, the upper-left flow path (66) and the indoor-side upper flow path (53) are brought into communication with each other by the second upper-left opening (33).

When assuming that the second lower plate (34) is divided into four equal sections in a right-to-left width direction, the openings (35, 36) of the second lower plate (34) are formed in right and left end sections of the second lower plate (34), respectively. And, of these two openings (35, 36) the one on the right end side constitutes a second lower-right opening (35) and the other on the left end side constitutes a second lower-left opening (36).

Each of the openings (35, 36) of the second lower plate (34) is switchable between a first state in which the second lower-right opening (35) is opened and the second lower-left opening (36) is closed, and a second state in which the second lower-right opening (35) is closed and the second lower-left opening (36) is opened. When the second lower-right opening (35) is placed in the open state, the indoor-side lower flow path (54) and the lower-right flow path (62) are brought into communication with each other by the second lower-right opening (35). On the other hand, when the second lower-left opening (36) is placed in the open state, the indoor-side lower flow path (54) and the lower-left flow path (67) are brought into communication with each other by the second lower-left opening (36).

As described above, the internal space of the casing (10) is partitioned front-to-rear by the first and second partition members (20, 30). Stated another way, the first and second partition members (20, 30) are disposed in such orientation that they cross an air flow path within the casing (10). And, the first upper plate (21) and the first lower plate (24) of the first partition member (20) constitute a flow path changing means capable of changing the flow route of air by their respective openings being switched between the open state and the closed state. Furthermore, the second upper plate (31) and the second lower plate (34) of the second partition member (30) constitute a flow path changing means capable of changing the flow route of air by their respective openings being switched between the open state and the closed state.

Running Operation

Referring to FIGS. 3–5, the running operation of the above-described air conditioning apparatus will be described. As has been described above, the air conditioning apparatus performs only a dehumidification operating mode. FIG. 3 typically shows a part between the first partition member (20) and the second partition member (30) within the casing (10).

As shown in FIGS. 4 and 5, when the air supply fan (95) is activated in the dehumidification operating mode, outdoor air is taken into the inside of the casing (10) through the air supply side inlet (13). The outdoor air flows, as first air, into the outdoor-side upper flow path (51). On the other hand, when the air discharge fan (96) is activated, indoor air is taken into the inside of the casing (10) through the air discharge side inlet (15). The indoor air flows, as second air, into the indoor-side upper flow path (53). Furthermore, in the dehumidification operating mode, refrigeration cycles are carried out in the refrigerant circuit, in which the regenerative heat exchanger (92) operates as a condenser and the cooling heat exchanger (94) operates as an evaporator. And, the air conditioning apparatus performs dehumidification operating mode by repeating first and second operations in alternation.

Referring to FIGS. 3 and 4, the first operation of the dehumidification operating mode will be described. During the first operation, air is dehumidified by the first adsorption element (81) and, at the same time, the adsorbent of the second adsorption element (82) is regenerated.

In the first upper plate (21), the first central upper-right opening (22) is opened and the first central upper-left opening (23) is closed. In this state, the first air (outdoor air), which has flowed into the outdoor-side upper flow path (51), passes through the first central upper-right opening (22) and flows into the first upper-central flow path (63).

In the second upper plate (31), the second upper-right opening (32) is opened and the second upper-left opening (33) is closed. In this state, the second air (indoor air), which has flowed into the indoor-side upper flow path (53), passes through the second upper-right opening (32) and flows into the upper-right flow path (61).

In the switch shutter (40), the shutter plate (42) is moved and located at such a position as to cover a right half portion of the regenerative heat exchanger (92). In this state, the lower-central flow path (65) and the second upper-central flow path (64) communicate with each other through the regenerative heat exchanger (92).

Figure 3A:
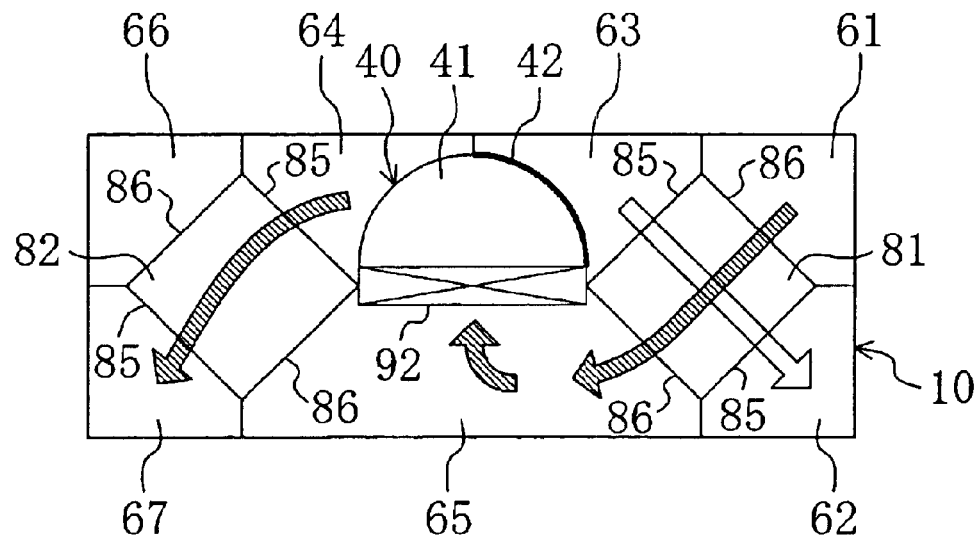
FIG. 3 is a diagram typically showing a principal part of the air conditioning apparatus according to the first embodiment.

As also shown in FIG. 3(a), the first air in the first upper-central flow path (63) flows into the humidity adjusting side passageway (85) of the first adsorption element (81). During the flow through the humidity adjusting side passageway (85), water vapor contained in the first air is adsorbed into the adsorbent. The first air dehumidified by the first adsorption element (81) flows into the lower-right flow path (62).

On the other hand, the second air in the upper-right flow path (61) flows into the cooling side passageway (86) of the first adsorption element (81). During the flow through the cooling side passageway (86), the second air absorbs heat of adsorption generated when water vapor is adsorbed into the adsorbent in the humidity adjusting side passageway (85). The second air, which has robbed heat of adsorption, flows into the lower-central flow path (65). The second air in the lower-central flow path (65) passes through the regenerative heat exchanger (92) and flows into the second upper-central flow path (64). During that period, in the regenerative heat exchanger (92) the second air is subjected to heat exchange with refrigerant and absorbs heat of condensation of the refrigerant.

The second air heated by the first adsorption element (81) and the regenerative heat exchanger (92) is introduced into the humidity adjusting side passageway (85) of the second adsorption element (82). In the humidity adjusting side passageway (85) the adsorbent is heated by the second air and, as a result, water vapor is desorbed from the adsorbent. In other words, the second adsorption element (82) is regenerated. Then, the water vapor desorbed from the adsorbent flows, together with the second air, into the lower-left flow path (67).

In the second lower plate (34), the second lower-right opening (35) is opened and the second lower-left opening (36) is closed. In this state, the first air in the lower-right flow path (62) passes through the second lower-right opening (35) and flows into the indoor-side lower flow path (54). During the flow through the indoor-side lower flow path (54), the first air passes through the cooling heat exchanger (94). In the cooling heat exchanger (94), the first air is subjected to heat exchange with refrigerant and liberates heat to the refrigerant. And, the first air dehumidified and cooled passes through the air supply side outlet (14) and is supplied indoors.

In the first lower plate (24), the first lower-left opening (26) is opened and the first lower-right opening (25) is closed. In this state, the second air, which has flowed into the lower-left flow path (67), passes through the first lower-left opening (26) and flows into the outdoor-side lower flow path (52). And, the second air, used for cooling of the first adsorption element (81) and regeneration of the second adsorption element (82), passes through the air discharge side outlet (16) and is discharged outdoors.

Referring now to FIG. 5, the second operation of the dehumidification operating mode will be described. Contrary to the first operation, in the second operation air is dehumidified in the second adsorption element (82) and, at the same time, the adsorbent of the first adsorption element (81) is regenerated.

In the first upper plate (21), the first central upper-left opening (23) is opened and the first central upper-right opening (22) is closed. In this state, first air (outdoor air), which has flowed into the outdoor-side upper flow path (51), passes through the first central upper-left opening (23) and flows into the second upper-central flow path (64).

In the second upper plate (31), the second upper-left opening (33) is opened and the second upper-right opening (32) is closed. In this state, second air (indoor air), which has flowed into the indoor-side upper flow path (53), passes through the second upper-left opening (33) and flows into the upper-left flow path (66).

In the switch shutter (40), the shutter plate (42) is moved and located at such a position as to cover a left half portion of the regenerative heat exchanger (92). In this state, the lower-central flow path (65) and the first upper-central flow path (63) communicate with each other through the regenerative heat exchanger (92).

Figure 3B:
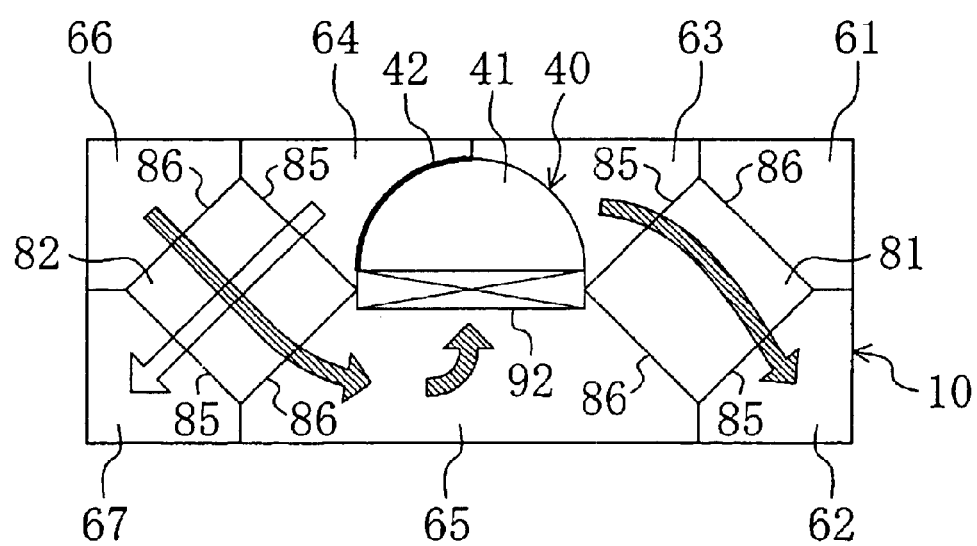

As also shown in FIG. 3(b), the first air in the second upper-central flow path (64) flows into the humidity adjusting side passageway (85) of the second adsorption element (82). During the flow through the humidity adjusting side passageway (85), water vapor contained in the first air is adsorbed into the adsorbent. The first air dehumidified by the second adsorption element (82) flows into the lower-left flow path (67).

On the other hand, the second air in the upper-left flow path (66) flows into the cooling side passageway (86) of the second adsorption element (82). During the flow through the cooling side passageway (86), the second air absorbs heat of adsorption generated when water vapor is adsorbed into the adsorbent in the humidity adjusting side passageway (85). The second air, which has robbed heat of adsorption, flows into the lower-central flow path (65). The second air in the lower-central flow path (65) passes through the regenerative heat exchanger (92) and flows into the first upper-central flow path (63). At that time, in the regenerative heat exchanger (92) the second air is subjected to heat exchange with refrigerant and absorbs heat of condensation of the refrigerant.

The second air heated by the second adsorption element (82) and the regenerative heat exchanger (92) is introduced into the humidity adjusting side passageway (85) of the first adsorption element (81). In the humidity adjusting side passageway (85), the adsorbent is heated by the second air and, as a result, water vapor is desorbed from the adsorbent. In other words, the first adsorption element (81) is regenerated. Then, the water vapor desorbed from the adsorbent flows, together with the second air, into the lower-right flow path (62).

In the second lower plate (34), the second lower-left opening (36) is opened and the second lower-right opening (35) is closed. In this state, the first air in the lower-left flow path (67) passes through the second lower-left opening (36) and flows into the indoor-side lower flow path (54). During the flow through the indoor-side lower flow path (54), the first air passes through the cooling heat exchanger (94). In the cooling heat exchanger (94), the first air is subjected to heat exchange with refrigerant and liberates heat to the refrigerant. And, the first air dehumidified and cooled passes through the air supply side outlet (14) and is supplied indoors.

In the first lower plate (24), the first lower-right opening (25) is opened and the first lower-left opening (26) is closed. In this state, the second air, which has flowed into the lower-right flow path (62), passes through the first lower-right opening (25) and flows into the outdoor-side lower flow path (52). And, the second air, used for cooling of the second adsorption element (82) and regeneration of the first adsorption element (81), passes through the air discharge side outlet (16) and is discharged outdoors.

Effects of First Embodiments

In the air conditioning apparatus of the first embodiment, the first and second operations are carried out switchably without having to rotate the adsorption elements (81, 82). Therefore, in accordance with the present embodiment, air leakage that is accompanied by rotational movement of the adsorption elements (81, 82) is prevented from occurring and the drop in air conditioning apparatus performance due to air leakage is prevented from occurring. Besides, the need for the provision of a mechanism for rotating the adsorption elements (81, 82) is eliminated, thereby making it possible to provide a simplified air conditioning apparatus structure and, as a result, the cost of production thereof is reduced.

Furthermore, in the first embodiment the second air used for regeneration of the adsorption elements (81, 82) is heated by heat exchange with refrigerant in the regenerative heat exchanger (92) of the refrigerant circuit. Where a refrigeration cycle is carried out by circulating refrigerant in the refrigerant circuit, the amount of heat that is given to the air in the regenerative heat exchanger (92) exceeds the power consumption in the compressor of the refrigerant circuit. In accordance with the present embodiment, the second air for regeneration is heated by the refrigeration cycle of the refrigerant circuit, thereby making it possible to provide dehumidification power in excess of the amount of energy necessary for performing a refrigeration cycle. As a result, the energy efficiency of the air conditioning apparatus is improved and the cost of energy required for operations thereof is cut down.

Second Embodiment of Invention

A second embodiment of the present invention is an air conditioning apparatus formed by altering the construction of the air conditioning apparatus of the first embodiment. The air conditioning apparatus of the second embodiment is able to perform, in addition to a dehumidification operating mode, a humidification operating mode in which outside air taken in is humidified and then supplied indoors. Here, only differences in construction from the air conditioning apparatus of the first embodiments will be described below.

Figure 6:
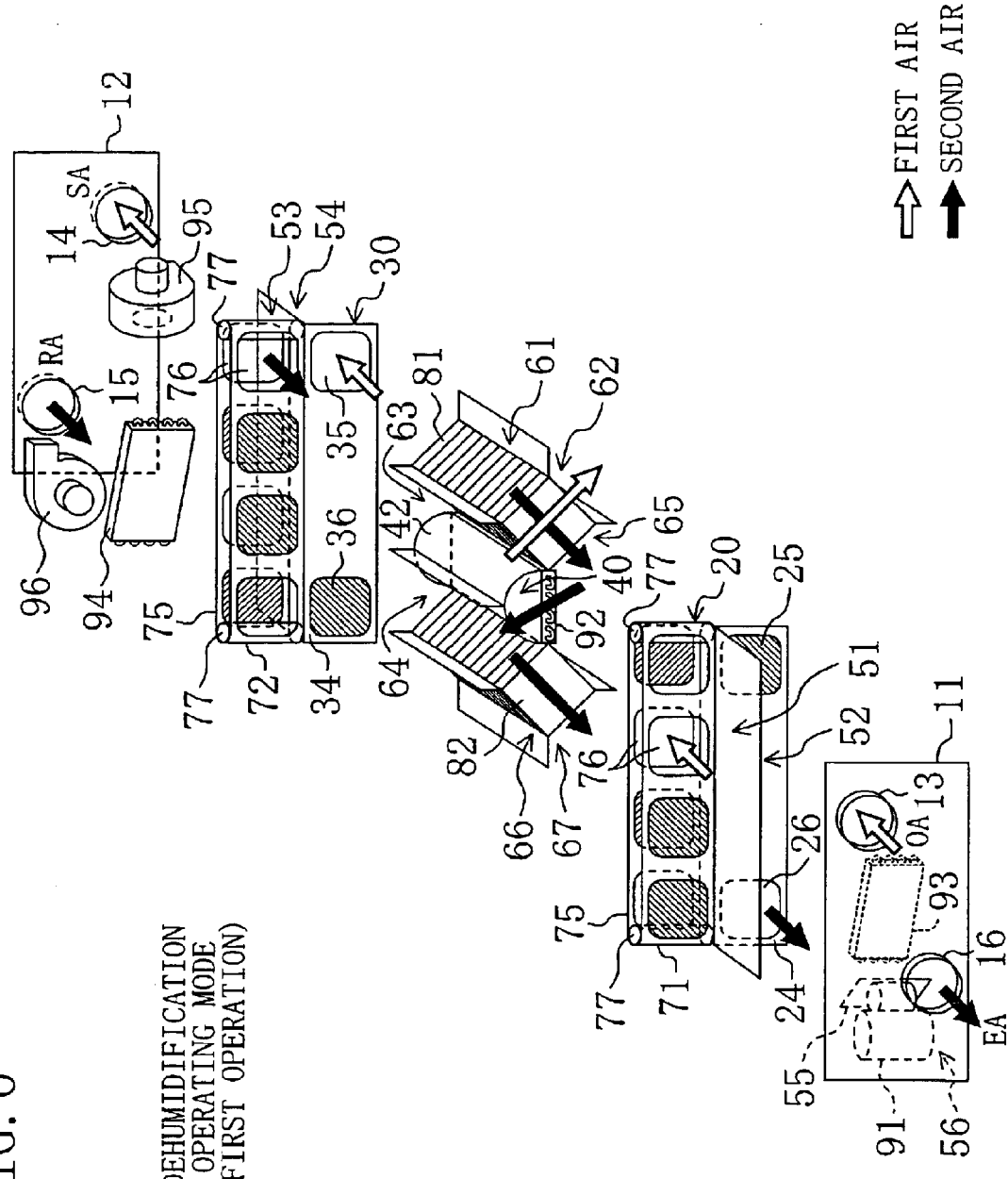
FIG. 6 is an exploded perspective view describing a first operation in the dehumidification operating mode of an air conditioning apparatus according to a second embodiment of the present invention.

As shown in FIG. 6, the first partition member (20) of the second embodiment is provided with a first upper shutter (71) in place of the first upper plate (21). Additionally, the second partition member (30) of the second embodiment is provided with a second upper shutter (72) in place of the second upper plate (31). Both the first upper shutter (71) and the second upper shutter (72) are first switching mechanisms and identical in construction with each other.

More specifically, the upper shutter (71, 72) comprises a single strip-like sheet (75) and two support rollers (77). The strip-like sheet (75), shaped like an endless loop, constitutes a strip-like member. The width of the strip-like sheet (75) is about half of the vertical height of the casing (10). The length of the strip-like sheet (75) is about twice the right-to-left width of the casing (10). Furthermore, there are formed four square-shaped openings (76) for air ventilation. When assuming that the strip-like sheet (75) is divided, in its length direction, into eight equal sections, the ventilation openings (76) of the strip-like sheet (75) are formed in predetermined four ones of the eight sections, respectively. These ventilation openings (76) constitute respective opening portions.

The support rollers (77) are arranged standingly at a right and a left end of each of the first and second partition members (20, 30), respectively. These two support rollers (77) constitute a pair of roller members. Additionally, at least one of the support rollers (77) is so constructed as to be driven by a motor or the like. The strip-like sheet (75) is spanningly passed around the two support rollers (77). In this state, the strip-like sheet (75) is so oriented as to cross an air flow path within the casing (10).

Each upper shutter (71, 72) permits the passage of air through where a ventilation opening (76) on the near side coincides with another on the far side in the strip-like sheet (75) spanningly passed around the support rollers (77). In each upper shutter (71, 72), the strip-like sheet (75) is forwarded by rotation of the support rollers (77) and the position at which the passage of air is permitted is varied with the movement of the position of the ventilation openings (76).

The first upper shutter (71) is switched to a state that allows only one of the upper-right flow path (61), the first upper-central flow path (63), the second upper-central flow path (64), and the upper-left flow path (66) to come into communication with the outdoor-side upper flow path (51). On the other hand, the second upper shutter (72) is switched to a state that allows only one of the upper-right flow path (61), the first upper-central flow path (63), the second upper-central flow path (64), and the upper-left flow path (66) to come into communication with the indoor-side upper flow path (53).

Connected to the refrigerant circuit of the second embodiment are first and second cooling heat exchangers (93, 94) as evaporators. In the refrigerant circuit of the second embodiment, the first cooling heat exchanger (93) and the second cooling heat exchanger (94) are connected together in parallel. And, the refrigerant circuit is so constructed as to be switched between a first operation state in which only the first cooling heat exchanger (93) operates as an evaporator and no refrigerant is introduced into the second cooling heat exchanger (94), and a second operation state in which only the second cooling heat exchanger (94) operates as an evaporator and no refrigerant is introduced into the first cooling heat exchanger (93).

As has been described above, in the second embodiment the first upper shutter (71) and the first lower plate (24) constitute the first partition member (20) and the second upper shutter (72) and the second lower plate (34) constitute the second partition member (30). And, the first and second upper shutters (71, 72) and the first and second lower plates (24, 34) constitute not only a flow path changing means but also an operating mode switching means.

Running Operation

The running operation of the air conditioning apparatus will be described with reference to FIGS. 3 and 6–9. As described above, the air conditioning apparatus is switched between a dehumidification operating mode and a humidification operating mode. FIG. 3 diagrammatically represents certain parts of the air conditioning apparatus according to the first embodiment, and also in the air conditioning apparatus of the second embodiments their corresponding parts are the same in construction as the first embodiment.

Dehumidification Operating Mode

Figure 7:
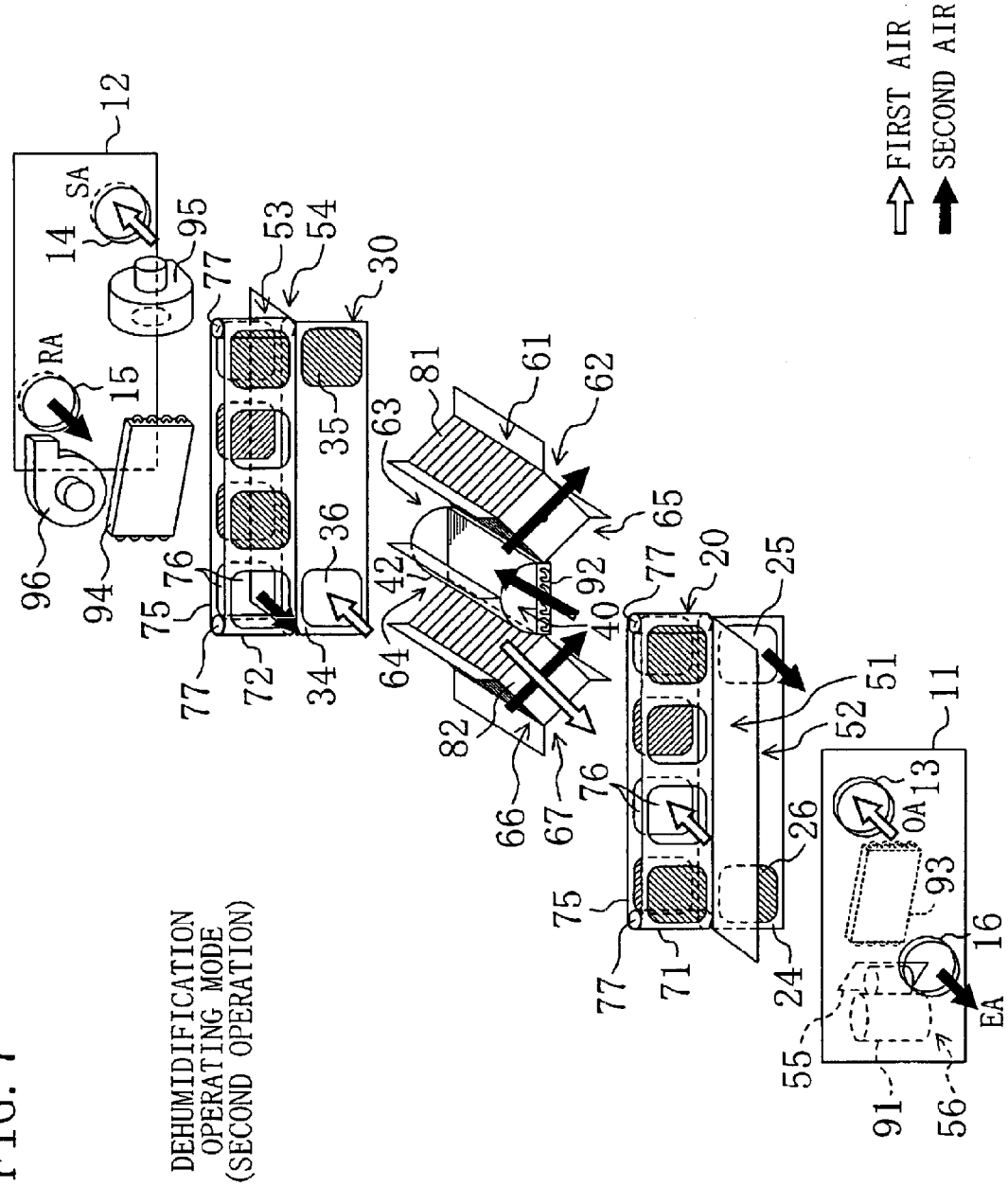
FIG. 7 is an exploded perspective view describing a second operation in the dehumidification operating mode of the air conditioning apparatus according to the second embodiment.

As shown in FIGS. 6 and 7, when the air supply fan (95) is activated in the dehumidification operating mode, outdoor air is taken into the inside of the casing (10) through the air supply side inlet (13). The outdoor air flows, as first air, into the outdoor-side upper flow path (51). On the other hand, when the air discharge fan (96) is activated, indoor air is taken into the inside of the casing (10) through the air discharge side inlet (15). The indoor air flows, as second air, into the indoor-side upper flow path (53).

Furthermore, during the dehumidification operating mode, refrigeration cycles are carried out in the refrigerant circuit, in which the regenerative heat exchanger (92) operates as a condenser and the second cooling heat exchanger (94) operates as an evaporator. In other words, in the dehumidification operating mode no refrigerant flows in the first cooling heat exchanger (93). And, the air conditioning apparatus performs dehumidification operating mode by repeating first and second operations in alternation.

Referring to FIGS. 3 and 6, the first operation of the dehumidification operating mode will be described. During the first operation, air is dehumidified by the first adsorption element (81) and, at the same time, the adsorbent of the second adsorption element (82) is regenerated.

The first upper shutter (71) is placed in a state that allows the outdoor-side upper flow path (51) and the first upper-central flow path (63) to communicate with each other. In this state, first air (outdoor air), which has flowed into the outdoor-side upper flow path (51), passes through a ventilation opening (76) of the first upper shutter (71) and flows into the first upper-central flow path (63).

The second upper shutter (72) is placed in a state that allows the indoor-side upper flow path (53) and the upper-right flow path (61) to communicate with each other. In this state, second air (indoor air), which has flowed into the indoor-side upper flow path (53), passes through a ventilation opening (76) of the second upper shutter (72) and flows into the upper-right flow path (61).

In the switch shutter (40), the shutter plate (42) is moved and located at such a position as to cover a right half portion of the regenerative heat exchanger (92). In this state, the lower-central flow path (65) and the second upper-central flow path (64) communicate with each other through the regenerative heat exchanger (92).

As also shown in FIG. 3(a), the first air in the first upper-central flow path (63) flows into the humidity adjusting side passageway (85) of the first adsorption element (81). During the flow through the humidity adjusting side passageway (85), water vapor contained in the first air is adsorbed into the adsorbent. The first air dehumidified by the first adsorption element (81) flows into the lower-right flow path (62).

On the other hand, the second air in the upper-right flow path (61) flows into the cooling side passageway (86) of the first adsorption element (81). During the flow through the cooling side passageway (86), the second air absorbs heat of adsorption generated when water vapor is adsorbed into the adsorbent in the humidity adjusting side passageway (85). The second air, which has robbed heat of adsorption, flows into the lower-central flow path (65). The second air in the lower-central flow path (65) passes through the regenerative heat exchanger (92) and flows into the second upper-central flow path (64). At that time, in the regenerative heat exchanger (92) the second air is subjected to heat exchange with refrigerant and absorbs heat of condensation of the refrigerant.

The second air heated by the first adsorption element (81) and the regenerative heat exchanger (92) is introduced into the humidity adjusting side passageway (85) of the second adsorption element (82). In the humidity adjusting side passageway (85) the adsorbent is heated by the second air and, as a result, water vapor is desorbed from the adsorbent. In other words, the second adsorption element (82) is regenerated. Then, the water vapor desorbed from the adsorbent flows, together with the second air, into the lower-left flow path (67).

In the second lower plate (34), the second lower-right opening (35) is opened and the second lower-left opening (36) is closed. In this state, the first air in the lower-right flow path (62) passes through the second lower-right opening (35) and flows into the indoor-side lower flow path (54). During the flow through the indoor-side lower flow path (54), the first air passes through the second cooling heat exchanger (94). In the second cooling heat exchanger (94), the first air is subjected to heat exchange with refrigerant and liberates heat to the refrigerant. And, the first air dehumidified and cooled passes through the air supply side outlet (14) and is supplied indoors.

In the first lower plate (24), the first lower-left opening (26) is opened and the first lower-right opening (25) is closed. In this state, the second air, which has flowed into the lower-left flow path (67), passes through the first lower-left opening (26) and flows into the outdoor-side lower flow path (52). During the flow through the outdoor-side lower flow path (52), the second air passes through the first cooling heat exchanger (93). At this time, no refrigerant flows in the first cooling heat exchanger (93). Accordingly, the second air just passes through the first cooling heat exchanger (93) and, therefore, neither absorbs nor liberates heat. And, the second air, used for cooling of the first adsorption element (81) and regeneration of the second adsorption element (82), passes through the air discharge side outlet (16) and is discharged outdoors.

Referring to FIG. 7, the second operation of the dehumidification operating mode will be described. Contrary to the first operation, in the second operation air is dehumidified by the second adsorption element (82) and, at the same time, the adsorbent of the first adsorption element (81) is regenerated.

The first upper shutter (71) is placed in a state that allows the outdoor-side upper flow path (51) and the second upper-central flow path (64) to communicate with each other. In this state, first air (outdoor air), which has flowed into the outdoor-side upper flow path (51), passes through a ventilation opening (76) of the first upper shutter (71) and flows into the second upper-central flow path (64).

The second upper shutter (72) is placed in a state that allows the indoor-side upper flow path (53) and the upper-left flow path (66) to communicate with each other. In this state, second air (indoor air), which has flowed into the indoor-side upper flow path (53), passes through a ventilation opening (76) of the second upper shutter (72) and flows into the upper-left flow path (66).

In the switch shutter (40), the shutter plate (42) is moved and located at such a position as to cover a left half portion of the regenerative heat exchanger (92). In this state, the lower-central flow path (65) and the first upper-central flow path (63) communicate with each other through the regenerative heat exchanger (92).

As also shown in FIG. 3(b), the first air in the second upper-central flow path (64) flows into the humidity adjusting side passageway (85) of the second adsorption element (82). During the flow through the humidity adjusting side passageway (85), water vapor contained in the first air is adsorbed into the adsorbent. The first air dehumidified by the second adsorption element (82) flows into the lower-left flow path (67).

On the other hand, the second air in the upper-left flow path (66) flows into the cooling side passageway (86) of the second adsorption element (82). During the flow through the cooling side passageway (86), the second air absorbs heat of adsorption generated when water vapor is adsorbed into the adsorbent in the humidity adjusting side passageway (85). The second air, which has robbed heat of adsorption, flows into the lower-central flow path (65). The second air in the lower-central flow path (65) passes through the regenerative heat exchanger (92) and flows into the first upper-central flow path (63). At that time, in the regenerative heat exchanger (92) the second air is subjected to heat exchange with refrigerant and absorbs heat of condensation of the refrigerant.

The second air heated by the second adsorption element (82) and the regenerative heat exchanger (92) is introduced into the humidity adjusting side passageway (85) of the first adsorption element (81). In the humidity adjusting side passageway (85), the adsorbent is heated by the second air and, as a result, water vapor is desorbed from the adsorbent. In other words, the first adsorption element (81) is regenerated. Then, the water vapor desorbed from the adsorbent flows, together with the second air, into the lower-right flow path (62).

In the second lower plate (34), the second lower-left opening (36) is opened and the second lower-right opening (35) is closed. In this state, the first air in the lower-left flow path (67) passes through the second lower-left opening (36) and flows into the indoor-side lower flow path (54). During the flow through the indoor-side lower flow path (54), the first air passes through the cooling heat exchanger (94). In the cooling heat exchanger (94), the first air is subjected to heat exchange with refrigerant and liberates heat to the refrigerant. And, the first air dehumidified and cooled passes through the air supply side outlet (14) and is supplied indoors.

In the first lower plate (24), the first lower-right opening (25) is opened and the first lower-left opening (26) is closed. In this state, the second air, which has flowed into the lower-right flow path (62), passes through the first lower-right opening (25) and flows into the outdoor-side lower flow path (52). And, the second air, used for cooling of the second adsorption element (82) and regeneration of the first adsorption element (81), passes through the air discharge side outlet (16) and is discharged outdoors.

Humidification Operating Mode

Figure 8:
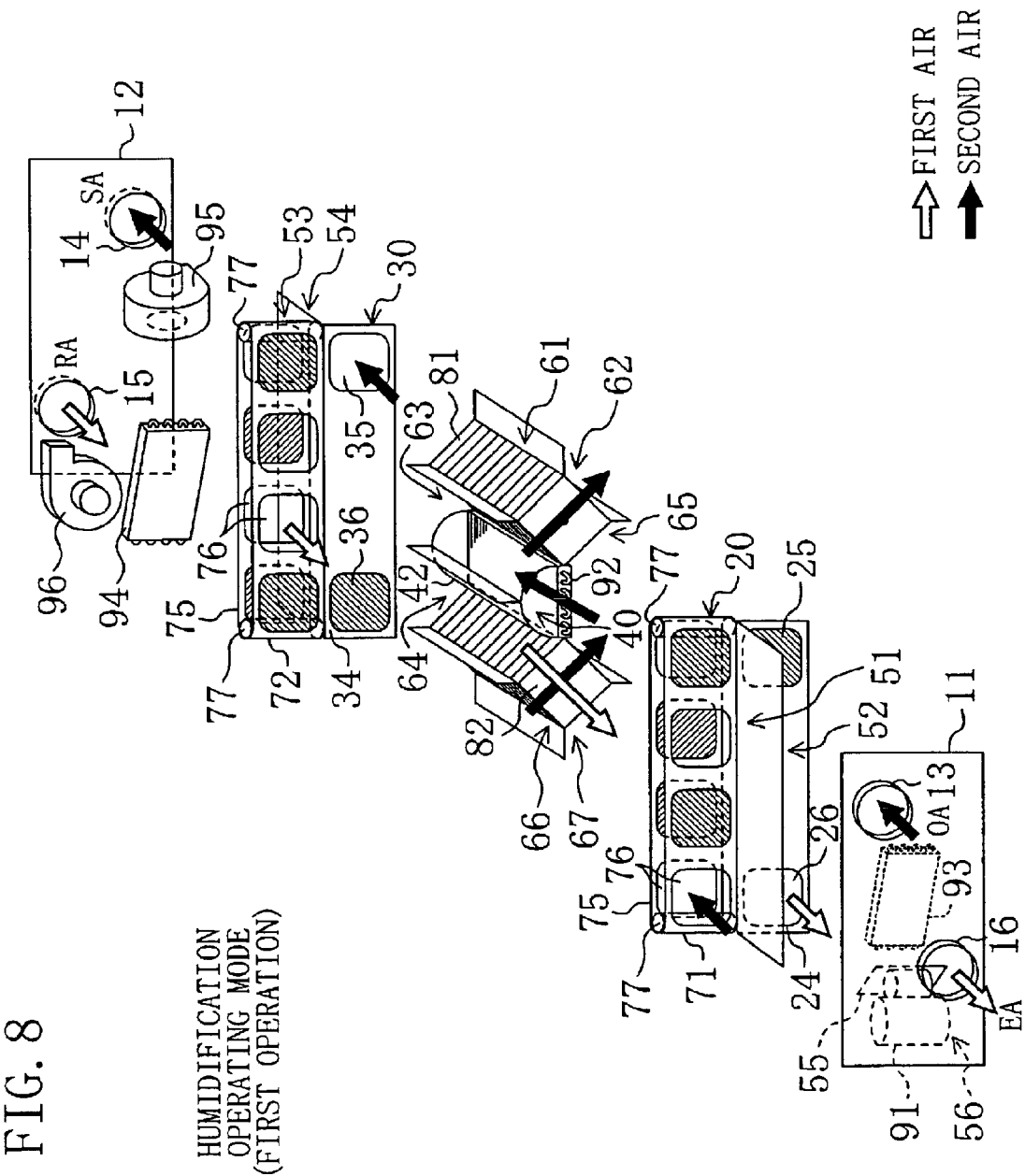
FIG. 8 is an exploded perspective view describing a first operation in the humidification operating mode of the air conditioning apparatus according to the second embodiment.
Figure 9:
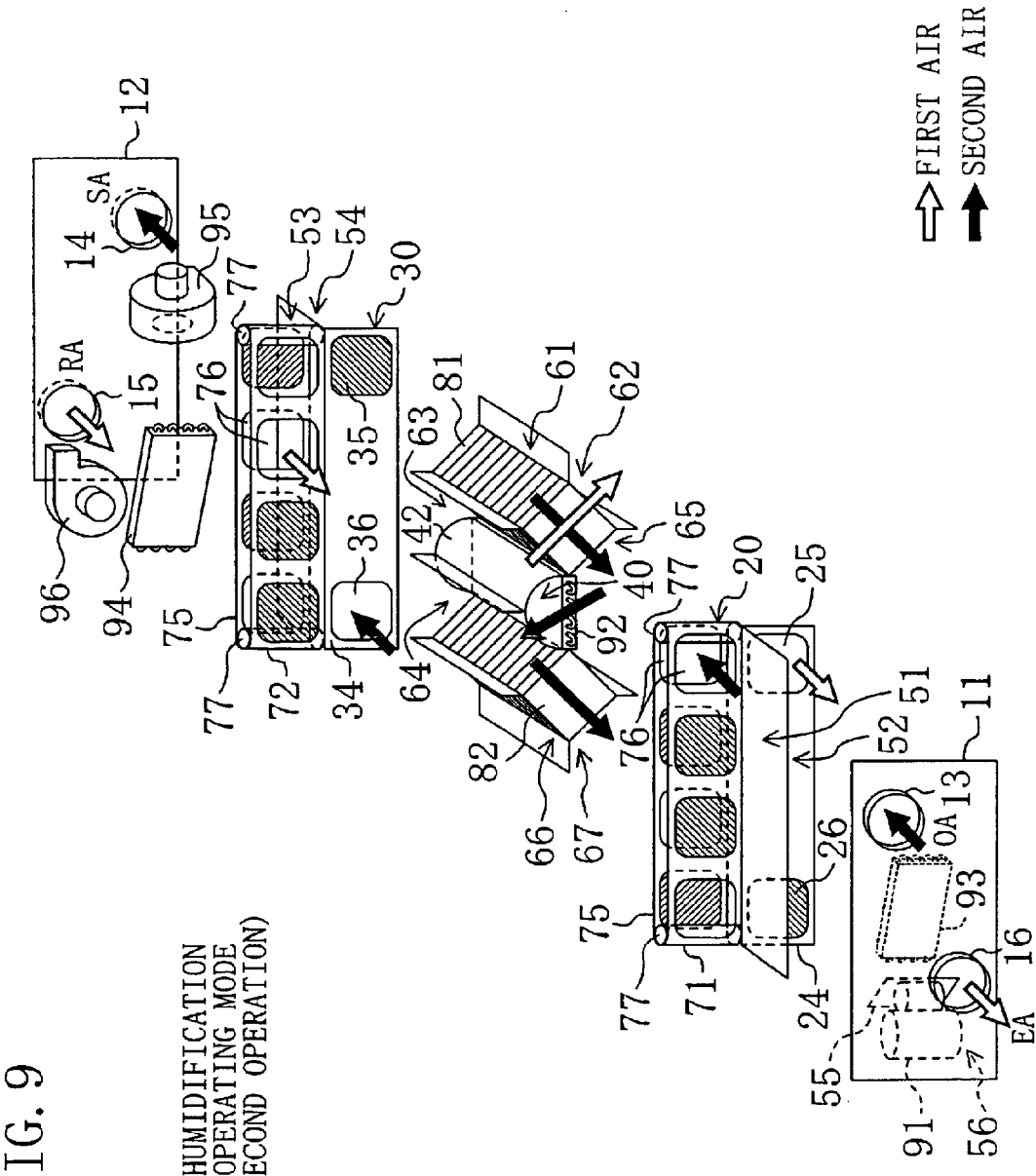
FIG. 9 is an exploded perspective view describing a second operation in the humidification operating mode of the air conditioning apparatus according to the second embodiment.

As shown in FIGS. 8 and 9, when the air supply fan (95) is activated in the humidification operating mode, outdoor air is taken into the inside of the casing (10) through the air supply side inlet (13). The outdoor air flows, as second air, into the outdoor-side upper flow path (51). On the other hand, when the air discharge fan (96) is activated, indoor air is taken into the inside of the casing (10) through the air discharge side inlet (15). The indoor air flows, as first air, into the indoor-side upper flow path (53).

Furthermore, during the humidification operating mode, refrigeration cycles are carried out in the refrigerant circuit, in which the regenerative heat exchanger (92) operates as a condenser and the first cooling heat exchanger (93) operates as an evaporator. In other words, in the dehumidification operating mode no refrigerant flows in the second cooling heat exchanger (94). And, the air conditioning apparatus performs humidification operating mode by repeatedly performing first and second operations in alternation.

Referring to FIGS. 3 and 8, the first operation of the humidification operating mode will be described. During the first operation, air is humidified by the first adsorption element (81) and the adsorbent of the second adsorption element (82) adsorbs water vapor.

The first upper shutter (71) is placed in a state that allows the outdoor-side upper flow path (51) and the upper-left flow path (66) to communicate with each other. In this state, second air (outdoor air), which has flowed into the outdoor-side upper flow path (51), passes through a ventilation opening (76) of the first upper shutter (71) and flows into the upper-left flow path (66).

The second upper shutter (72) is placed in a state that allows the indoor-side upper flow path (53) and the second upper-central flow path (64) to communicate with each other. In this state, first air (indoor air), which has flowed into the indoor-side upper flow path (53), passes through a ventilation opening (76) of the second upper shutter (72) and flows into the second upper-central flow path (64).

In the switch shutter (40), the shutter plate (42) is moved and located at such a position as to cover a left half portion of the regenerative heat exchanger (92). In this state, the lower-central flow path (65) and the first upper-central flow path (63) communicate with each other through the regenerative heat exchanger (92).

As also shown in FIG. 3(b), the first air in the second upper-central flow path (64) flows into the humidity adjusting side passageway (85) of the second adsorption element (82). During the flow through the humidity adjusting side passageway (85), water vapor contained in the first air is adsorbed into the adsorbent. The first air dehumidified by the second adsorption element (82) flows into the lower-left flow path (67).

On the other hand, the second air in the upper-left flow path (66) flows into the cooling side passageway (86) of the second adsorption element (82). During the flow through the cooling side passageway (86), the second air absorbs heat of adsorption generated when water vapor is adsorbed into the adsorbent in the humidity adjusting side passageway (85). The second air, which has robbed heat of adsorption, flows into the lower-central flow path (65). The second air in the lower-central flow path (65) passes through the regenerative heat exchanger (92) and flows into the first upper-central flow path (63). At that time, in the regenerative heat exchanger (92) the second air is subjected to heat exchange with refrigerant and absorbs heat of condensation of the refrigerant.

The second air heated by the second adsorption element (82) and the regenerative heat exchanger (92) is introduced into the humidity adjusting side passageway (85) of the first adsorption element (81). In the humidity adjusting side passageway (85), the adsorbent is heated by the second air and, as a result, water vapor is desorbed from the adsorbent. In other words, the first adsorption element (81) is regenerated. Then, the water vapor desorbed from the adsorbent is given to the second air and, as a result, the second air is humidified. Thereafter, the second air humidified by the first adsorption element (81) flows into the lower-right flow path (62).

In the second lower plate (34), the second lower-right opening (35) is opened and the second lower-left opening (36) is closed. In this state, the second air in the lower-right flow path (62) passes through the second lower-right opening (35) and flows into the indoor-side lower flow path (54). During the flow through the indoor-side lower flow path (54), the second air passes through the second cooling heat exchanger (94). At this time, no refrigerant flows in the second cooling heat exchanger (94). Accordingly, the second air just passes through the second cooling heat exchanger (94) and therefore neither absorbs nor liberates heat. And, the second air heated and humidified passes through the air supply side outlet (14) and is supplied indoors.

In the first lower plate (24), the first lower-left opening (26) is opened and the first lower-right opening (25) is closed. In this state, the first air, which has flowed into the lower-left flow path (67), passes through the first lower-left opening (26) and flows into the outdoor-side lower flow path (52). During the flow through the outdoor-side lower flow path (52), the first air passes through the first cooling heat exchanger (93). In the first cooling heat exchanger (93), the first air is subjected to heat exchange with refrigerant and liberates heat to the refrigerant. And, the first air dehumidified and cooled passes through the air discharge side outlet (16) and is discharged outdoors.

Referring to FIGS. 3 and 9, the second operation of the humidification operating mode will be described. Contrary to the first operation, in the second operation air is humidified in the second adsorption element (82) and the adsorbent of the first adsorption element (81) adsorbs water vapor.

The first upper shutter (71) is placed in a state that allows the outdoor-side upper flow path (51) and the upper-right flow path (61) to communicate with each other. In this state, second air (outdoor air), which has flowed into the outdoor-side upper flow path (51), passes through a ventilation opening (76) of the first upper shutter (71) and flows into the upper-right flow path (61).

The second upper shutter (72) is placed in a state that allows the indoor-side upper flow path (53) and the first upper-central flow path (63) to communicate with each other. In this state, first air (indoor air), which has flowed into the indoor-side upper flow path (53), passes through a ventilation opening (76) of the second upper shutter (72) and flows into the first upper-central flow path (63).

In the switch shutter (40), the shutter plate (42) is moved and located at such a position as to cover a right half portion of the regenerative heat exchanger (92). In this state, the lower-central flow path (65) and the second upper-central flow path (64) communicate with each other through the regenerative heat exchanger (92).

As also shown in FIG. 3(b), the first air in the first upper-central flow path (63) flows into the humidity adjusting side passageway (85) of the first adsorption element (81). During the flow through the humidity adjusting side passageway (85), water vapor contained in the first air is adsorbed into the adsorbent. The first air dehumidified by the first adsorption element (81) flows into the lower-right flow path (62).

On the other hand, the second air in the upper-right flow path (61) flows into the cooling side passageway (86) of the first adsorption element (81). During the flow through the cooling side passageway (86), the second air absorbs heat of adsorption generated when water vapor is adsorbed into the adsorbent in the humidity adjusting side passageway (85). The second air, which has robbed heat of adsorption, flows into the lower-central flow path (65). The second air in the lower-central flow path (65) passes through the regenerative heat exchanger (92) and flows into the second upper-central flow path (64). At that time, in the regenerative heat exchanger (92) the second air is subjected to heat exchange with refrigerant and absorbs heat of condensation of the refrigerant.

The second air heated by the first adsorption element (81) and the regenerative heat exchanger (92) is introduced into the humidity adjusting side passageway (85) of the second adsorption element (82). In the humidity adjusting side passageway (85) the adsorbent is heated by the second air and, as a result, water vapor is desorbed from the adsorbent. In other words, the second adsorption element (82) is regenerated. Then, the water vapor desorbed from the adsorbent is given to the second air and, as a result, the second air is humidified. Thereafter, the second air humidified by the second adsorption element (82) flows into the lower-left flow path (67).

In the second lower plate (34), the second lower-left opening (36) is opened and the second lower-right opening (35) is closed. In this state, the second air in the lower-left flow path (67) passes through the second lower-left opening (36) and flows into the indoor-side lower flow path (54). During the flow through the indoor-side lower flow path (54), the second air passes through the second cooling heat exchanger (94). At this time, no refrigerant circulates in the second cooling heat exchanger (94). Accordingly, the second air just passes through the second cooling heat exchanger (94) and, therefore, neither absorbs nor liberates heat. And, the second air heated and humidified passes through the air supply side outlet (14) and is supplied indoors.

In the first lower plate (24), the first lower-right opening (25) is opened and the first lower-left opening (26) is closed. In this state, the first air, which has flowed into the lower-right flow path (62), passes through the first lower-right opening (25) and flows into the outdoor-side lower flow path (52). During the flow through the outdoor-side lower flow path (52), the first air passes through the first cooling heat exchanger (93). In the first cooling heat exchanger (93), the first air is subjected to heat exchange with refrigerant and liberates heat to the refrigerant. And, the first air dehumidified and cooled passes through the air discharge side outlet (16) and is discharged outdoors.

Modification Example of Second Embodiment

If the air conditioning apparatus of the second embodiment is constructed such that outdoor air is taken in, through the air discharge side outlet (16) and indoor air is discharged through the air supply side inlet (13), this construction makes it possible to perform a cooling operating mode by the utilization of outside air (outside air introducing operating mode) in which outdoor air (outside air) taken in is supplied indoors as it is. In other words, the temperature of outside air may be lower than room temperature in a so-called intermediate season. In such a period, the cooling of an indoor space is achieved only by supplying outside air into the indoor space.

More specifically, during the outside-air utilizing cooling operating mode the first lower-right opening (25) is opened and the first lower-left opening (26) is closed in the first lower plate (24). On the other hand in the second lower plate (34) the second lower-right opening (35) is closed and the second lower-left opening (36) is closed. When the air supply fan (95) is activated in such a state, outdoor air passes through the air discharge side outlet (16) and flows into the outdoor-side lower flow path (52). Then, the outdoor air flows into the indoor-side lower flow path (54) through the lower-right flow path (62) and is supplied indoors through the air supply side outlet (14).

On the other hand, the second upper shutter (72) is placed in a state that allows the indoor-side upper flow path (53) and the upper-right flow path (61) to communicate with each other. The first upper shutter (71) is placed in a state that allows the upper-right flow path (61) and the outdoor-side upper flow path (51) to communicate with each other. When the air discharge fan (96) is activated in such a state, indoor air passes through the air discharge side inlet (15) and flows into the indoor-side upper flow path (53). Then, the indoor air flows into the indoor-side upper flow path (53) through the upper-left flow path (66) and is discharged outdoors through the air supply side inlet (13).

Third Embodiment of Invention

A third embodiment of the present invention is an air conditioning apparatus formed by altering the construction of the air conditioning apparatus of the second embodiment. The air conditioning apparatus of the third embodiment performs a cooling operation at the time of switching between the first and second operations of the dehumidification operating mode. Additionally, the air conditioning apparatus of the third embodiment is able to perform an outside-air utilizing cooling operating mode (outside air introducing operating mode) in which outdoor air (outside air) taken in is supplied indoors as it is. Here, only differences in construction from the air conditioning apparatus of the second embodiments will be described below.

Figure 10:
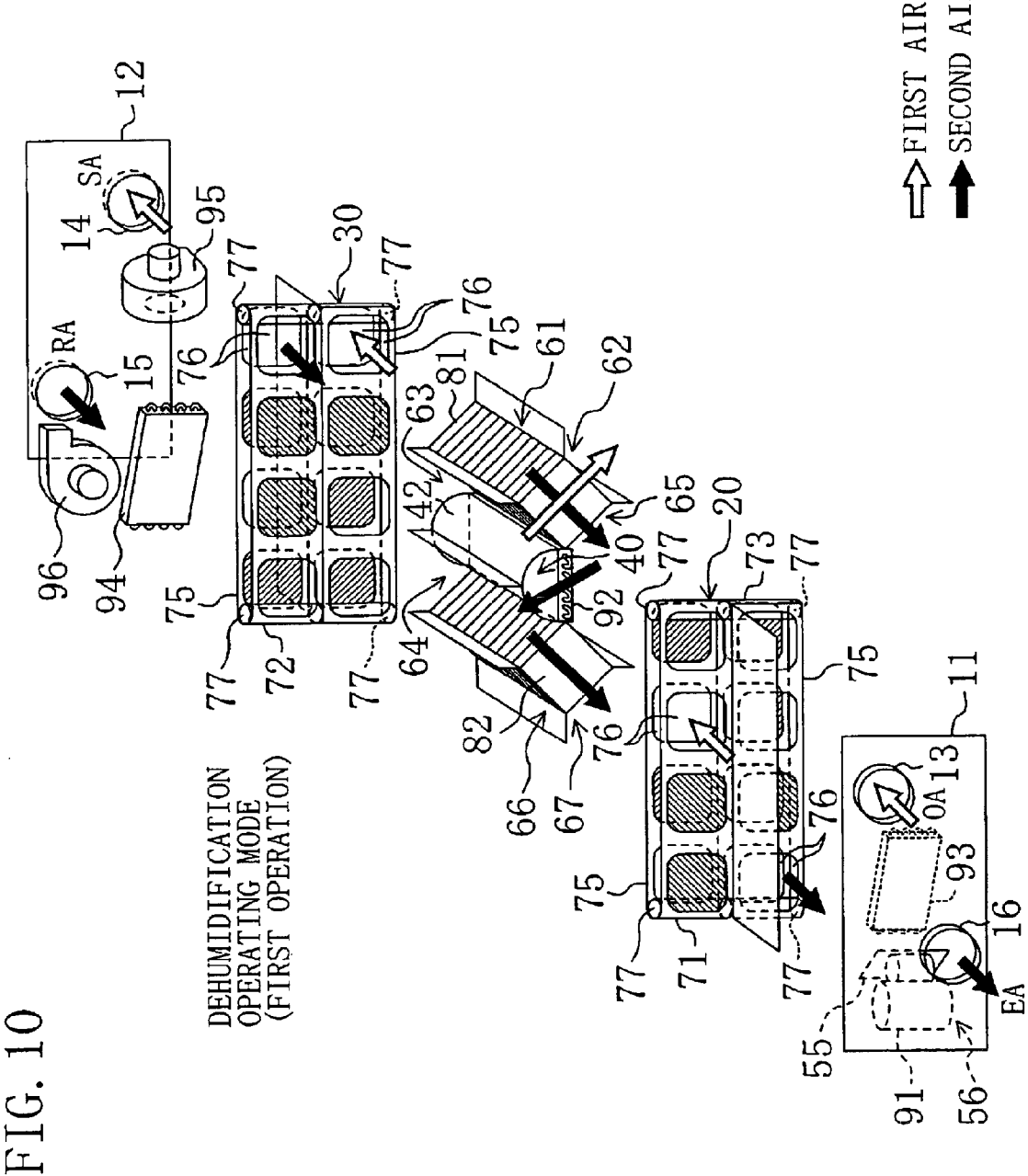
FIG. 10 is an exploded perspective view describing a first operation in the dehumidification operating mode of an air conditioning apparatus according to a third embodiment of the present invention.

As shown in FIG. 10, the first partition member (20) of the third embodiment is provided with a first lower shutter (73) in place of the first lower plate (24). Additionally, the second partition member (30) of the third embodiment is provided with a second lower shutter (74) in place of the second lower plate (34). Both the first lower shutter (73) and the second lower shutter (74) are first switching mechanisms and are identical in construction with each other.

More specifically, the lower shutters (73, 74) are identical in construction with the upper shutters (71, 72). Stated another way, the lower shutter (73, 74) is formed by a pair of support rollers (77) and a strip-like sheet (75) provided with four ventilation openings (76) and spanningly passed around the support rollers (77). In the strip-like sheet (75) of the lower shutter (73, 74), the four ventilation openings (76) are formed in different positions from the strip-like sheet (75) of the upper shutter (71, 72).

The first lower shutter (73) is switched to a state that allows only one of the lower-right flow path (62), the lower-central flow path (65), and the lower-left flow path (67) to come into communication with the outdoor-side lower flow path (52). On the other hand, the second lower shutter (74) is switched to a state that allows only one of the lower-right flow path (62), the lower-central flow path (65), and the lower-left flow path (67) to come into communication with the indoor-side lower flow path (54).

As has been described above, in the third embodiment the first upper shutter (71) and the first lower shutter (73) constitute the first partition member (20), and the second upper shutter (72) and the second lower shutter (74) constitute the second partition member (30). And, the first and second upper shutters (71, 72) and the first and second lower shutters (73, 74) constitute not only a flow path changing means but also an operating mode switching means.

Running Operation

The running operation of the air conditioning apparatus will be described with reference to FIGS. 10–15. As described above, the air conditioning apparatus is switched among a dehumidification operating mode, a humidification operating mode, and an outside-air utilizing cooling operating mode.

Dehumidification Operating Mode

As shown in FIGS. 10–13, when the air supply fan (95) is activated in the dehumidification operating mode, outdoor air is taken into the inside of the casing (10) through the air supply side inlet (13). The outdoor air flows, as first air, into the outdoor-side upper flow path (51). On the other hand, when the air discharge fan (96) is activated, indoor air is taken into the inside of the casing (10) through the air discharge side inlet (15). The indoor air flows, as second air, into the indoor-side upper flow path (53).

Furthermore, during the dehumidification operating mode, refrigeration cycles are carried out in the refrigerant circuit, in which the regenerative heat exchanger (92) operates as a condenser and the second cooling heat exchanger (94) operates as an evaporator. In other words, in the dehumidification operating mode no refrigerant flows in the first cooling heat exchanger (93). And, in the dehumidification operating mode of the air conditioning apparatus a first operation, a first cooling operation, a second operation, and a second cooling operation are carried out in that order. After the second cooling operation, the dehumidification operating mode returns again to a first operation, and these operations are repeatedly carried out.

Referring to FIG. 10, the first operation of the dehumidification operating mode will be described. During the first operation, air is dehumidified by the first adsorption element (81) and, at the same time, the adsorbent of the second adsorption element (82) is regenerated.

The first upper shutter (71), the second upper shutter (72), and the switch shutter (40) are all placed in the same states that they are placed in the first operation of the dehumidification operating mode in the second embodiment. More specifically, the first upper shutter (71) is placed in a state that allows the outdoor-side upper flow path (51) and the first upper-central flow path (63) to communicate with each other. The second upper shutter (72) is placed in a state that allows the indoor-side upper flow path (53) and the upper-right flow path (61) to communicate with each other. In the switch shutter (40), the shutter plate (42) is moved and located at such a position as to cover a right half portion of the regenerative heat exchanger (92).

On the other hand, the first lower shutter (73) is placed in a state that allows the lower-left flow path (67) and the outdoor-side lower flow path (52) to communicate with each other. Additionally, the second lower shutter (74) is placed in a state that allows the lower-right flow path (62) and the indoor-side lower flow path (54) to communicate with each other.

In this state, outdoor air taken in as first air and indoor air taken in as second air flow in the same way as in the first operation of the dehumidification operating mode in the second embodiment, in the air conditioning apparatus.

To sum up, the first air flows through the outdoor-side upper flow path (51), a ventilating opening (76) of the first upper shutter (71), and the first upper-central flow path (63) in that order, flows into the humidity adjusting side passageway (85) of the first adsorption element (81), and is dehumidified there. The thus-dehumidified first air flows through the lower-right flow path (62), a ventilation opening (76) of the second lower shutter (74), and the indoor-side lower flow path (54) in that order and is supplied indoors through the air supply side outlet (14).

On the other hand, the second air flows through the indoor-side upper flow path (53), a ventilating opening (76) of the second upper shutter (72), and the upper-right flow path (61) in that order, is heated in the first adsorption element (81) and the regenerative heat exchanger (92), and thereafter flows into the humidity adjusting side passageway (85) of the second adsorption element (82). The second air, which was used to regenerate the second adsorption element (82), flows through the lower-left flow path (67), a ventilation opening (76) of the first lower shutter (73), and the outdoor-side lower flow path (52) in that order and is discharged outdoors through the air discharge side outlet (16).

The first cooling operation of the dehumidification operating mode will be described with reference to FIG. 11. In the first cooling operation, the second adsorption element (82) regenerated in the first operation is cooled.

During the first cooling operation, the first upper shutter (71), the second lower shutter (74), and the switch shutter (40) are all placed in the same states as in the first operation. Accordingly, first air (outdoor air), which has flowed into the outdoor-side upper flow path (51), passes through the humidity adjusting side passageway (85) of the first adsorption element (81) and thereafter is supplied indoors through the air supply side outlet (14), as in the first operation. In other words, also during the first cooling operation air dehumidification by the first adsorption element (81) is continued.

The second upper shutter (72) is placed in a state that allows the indoor-side upper flow path (53) and the upper-left flow path (66) to communicate with each other. In this state, second air (indoor air), which has flowed into the indoor-side upper flow path (53), flows into the upper-left flow path (66) through a ventilation opening (76) of the second upper shutter (72). Thereafter, the second air is introduced into the cooling side passageway (86) of the second adsorption element (82). The flowing of the second air through the cooling side passageway (86) cools the second adsorption element (82) regenerated in the first operation.

The first lower shutter (73) is placed in a state that allows the lower-central flow path (65) and the outdoor-side lower flow path (52) to communicate with each other. In this state, the second air, which was used to cool the second adsorption element (82), flows through the lower-central flow path (65), a ventilation opening (76) of the first lower shutter (73), and the outdoor-side lower flow path (52) in that order and thereafter is discharged outdoors through the air discharge side outlet (16).

Figure 12:
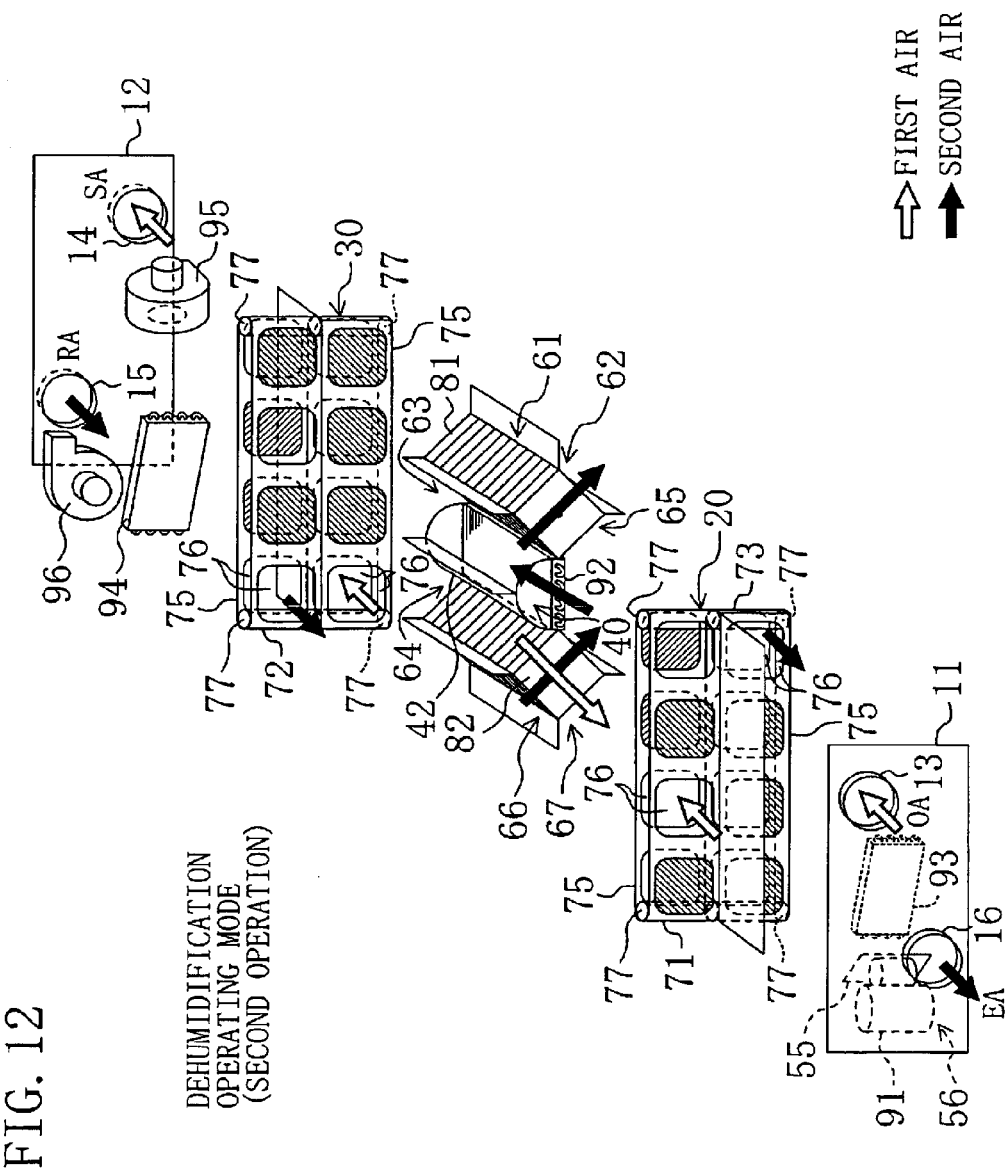
FIG. 12 is an exploded perspective view describing a second operation in the dehumidification operating mode of the air conditioning apparatus according to the third embodiment.

Referring to FIG. 12, the second operation of the dehumidification operating mode will be described. In the second operation, air is dehumidified by the second adsorption element (82) and, at the same time, the adsorbent of the first adsorption element (81) is regenerated.

The first upper shutter (71), the second upper shutter (72), and the switch shutter (40) are all placed in the same states as in the second operation of the dehumidification operating mode in the second embodiment. More specifically, the first upper shutter (71) is placed in a state that allows the outdoor-side upper flow path (51) and the second upper-central flow path (64) to communicate with each other. The second upper shutter (72) is placed in a state that allows the indoor-side upper flow path (53) and the upper-left flow path (66) to communicate with each other. In the switch shutter (40), the shutter plate (42) is moved and located at such a position as to cover a left half portion of the regenerative heat exchanger (92).

On the other hand, the first lower shutter (73) is placed in a state that allows the lower-right flow path (62) and the outdoor-side lower flow path (52) to communicate with each other. Additionally, the second lower shutter (74) is placed in a state that allows the lower-left flow path (67) and the indoor-side lower flow path (54) to communicate with each other.

In this state, air taken in as first air and indoor air taken in as second air flow in the same way as in the second operation of the dehumidification operating mode in the second embodiment, in the air conditioning apparatus outdoor.

To sum up, the first air flows through the outdoor-side upper flow path (51), a ventilating opening (76) of the first upper shutter (71), and the second upper-central flow path (64) in that order, flows into the humidity adjusting side passageway (85) of the second adsorption element (82), and is dehumidified there. The thus-dehumidified first air flows through the lower-left flow path (67), a ventilation opening (76) of the second lower shutter (74), and the indoor-side lower flow path (54) in that order and is supplied indoors through the air supply side outlet (14).

On the other hand, the second air flows through the indoor-side upper flow path (53), a ventilating opening (76) of the second upper shutter (72), and the upper-left flow path (66) in that order, is heated in the second adsorption element (82) and the regenerative heat exchanger (92), and thereafter flows into the humidity adjusting side passageway (85) of the first adsorption element (81). The second air, which was used to regenerate the first adsorption element (81), flows through the lower-right flow path (62), a ventilation opening (76) of the first lower shutter (73), and the outdoor-side lower flow path (52) in that order and is discharged outdoors through the air discharge side outlet (16).

Figure 13:
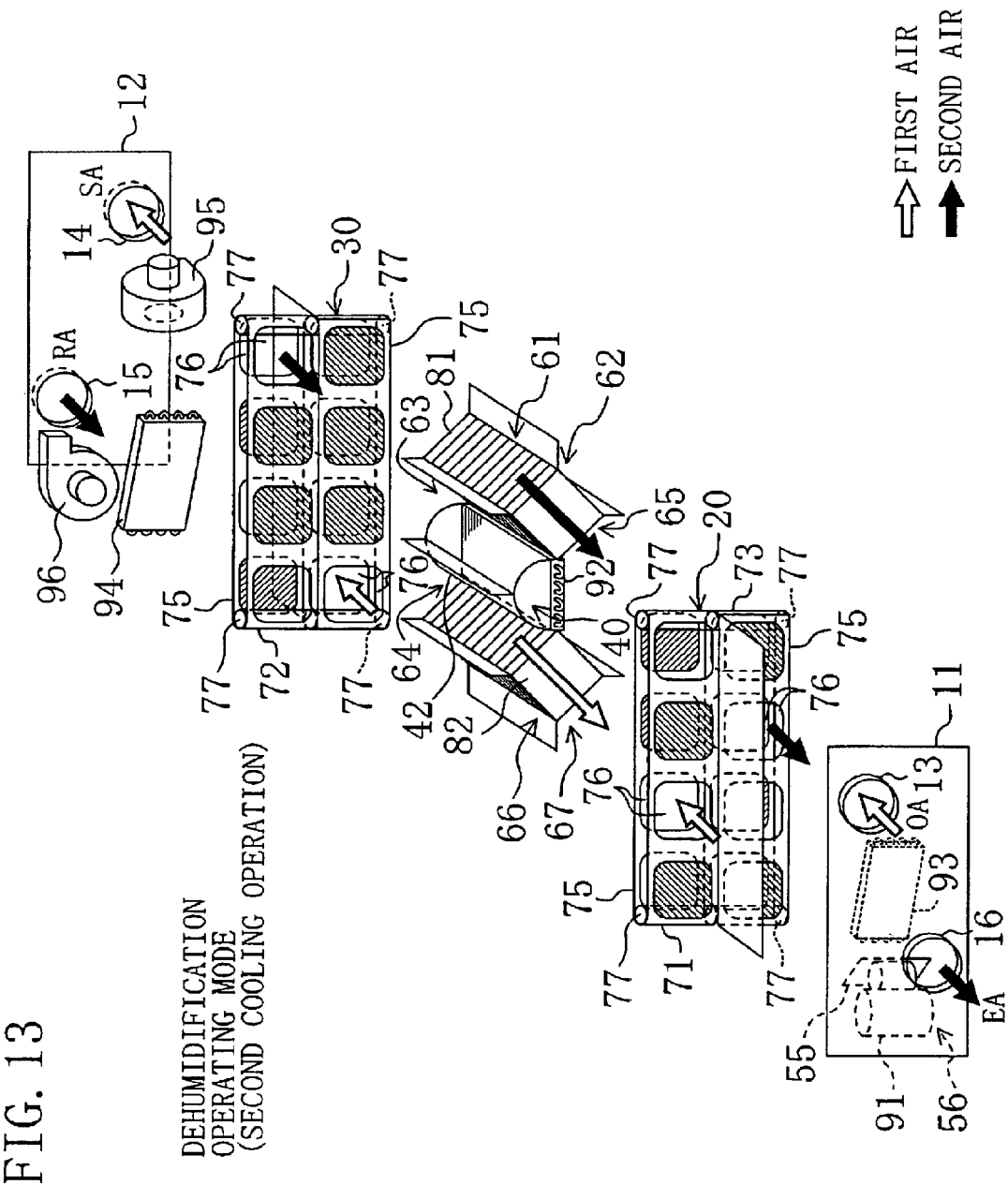
FIG. 13 is an exploded perspective view describing a second cooling operation in the dehumidification operating mode of the air conditioning apparatus according to the third embodiment.

Referring to FIG. 13, the second cooling operation of the dehumidification operating mode will be described. In the second cooling operation, the first adsorption element (81) regenerated in the second operation is cooled.

During the second cooling operation, the first upper shutter (71), the second lower shutter (74), and the switch shutter (40) are all placed in the same states as in the second operation. Accordingly, first air (outdoor air), which has flowed into the outdoor-side upper flow path (51), passes through the humidity adjusting side passageway (85) of the second adsorption element (82) and thereafter is supplied indoors through the air supply side outlet (14), as in the second operation. In other words, also during the first cooling operation air dehumidification by the second adsorption element (82) is continued.

The second upper shutter (72) is placed in a state that allows the indoor-side upper flow path (53) and the upper-right flow path (61) to communicate with each other. In this state, second air (indoor air), which has flowed into the indoor-side upper flow path (53), flows into the upper-right flow path (61) through a ventilation opening (76) of the second upper shutter (72). Thereafter, the second air is introduced into the cooling side passageway (86) of the first adsorption element (81). The flowing of the second air through the cooling side passageway (86) cools the first adsorption element (81) regenerated in the second operation.

The first lower shutter (73) is placed in a state that allows the lower-central flow path (65) and the outdoor-side lower flow path (52) to communicate with each other. In this state, the second air, which was used to cool the first adsorption element (81), flows through the lower-central flow path (65), a ventilation opening (76) of the first lower shutter (73), and the outdoor-side lower flow path (52) in that order and thereafter is discharged outdoors through the air discharge side outlet (16).

Humidification Operating Mode

As shown in FIGS. 14 and 15, when the air supply fan (95) is activated in the humidification operating mode, outdoor air is taken into the inside of the casing (10) through the air supply side inlet (13). The outdoor air flows, as second air, into the outdoor-side upper flow path (51). On the other hand, when the air discharge fan (96) is activated, indoor air is taken into the inside of the casing (10) through the air discharge side inlet (15). The indoor air flows, as first air, into the indoor-side upper flow path (53).

Furthermore, during the humidification operating mode, refrigeration cycles are carried out in the refrigerant circuit, in which the regenerative heat exchanger (92) operates as a condenser and the first cooling heat exchanger (93) operates as an evaporator. In other words, in the dehumidification operating mode no refrigerant flows in the second cooling heat exchanger (94). And, the air conditioning apparatus performs humidification operating mode by repeatedly performing first and second operations in alternation.

Referring to FIG. 14, the first operation of the humidification operating mode will be described. During the first operation, air is humidified by the first adsorption element (81) and the adsorbent of the second adsorption element (82) adsorbs water vapor.

The first upper shutter (71), the second upper shutter (72), and the switch shutter (40) are all placed in the same states as in the first operation of the humidification operating mode in the second embodiment. More specifically, the first upper shutter (71) is placed in a state that allows the outdoor-side upper flow path (51) and the upper-left flow path (66) to communicate with each other. The second upper shutter (72) is placed in a state that allows the indoor-side upper flow path (53) and the second upper-central flow path (64) to communicate with each other. In the switch shutter (40), the shutter plate (42) is moved and located at such a position as to cover a left half portion of the regenerative heat exchanger (92).

On the other hand, the first lower shutter (73) is placed in a state that allows the lower-left flow path (67) and the outdoor-side lower flow path (52) to communicate with each other. Additionally, the second lower shutter (74) is placed in a state that allows the lower-right flow path (62) and the indoor-side lower flow path (54) to communicate with each other.

In this state, indoor air taken in as first air and outdoor air taken in as second air flow in the same way as in the first operation of the humidification operating mode in the second embodiment, in the air conditioning apparatus.

To sum up, the first air flows through the indoor-side upper flow path (53), a ventilating opening (76) of the second upper shutter (72), and the second upper-central flow path (64) in that order, flows into the humidity adjusting side passageway (85) of the second adsorption element (82), and is dehumidified there. The thus-dehumidified first air flows through the lower-left flow path (67), a ventilation opening (76) of the first lower shutter (73), and the outdoor-side lower flow path (52) in that order and is discharged outdoors through the air discharge side outlet (16).

On the other hand, the second air flows through the outdoor-side upper flow path (51), a ventilating opening (76) of the first upper shutter (71), and the upper-left flow path (66) in that order, is heated in the second adsorption element (82) and the regenerative heat exchanger (92), and thereafter flows into the humidity adjusting side passageway (85) of the first adsorption element (81). The second air humidified by the first adsorption element (81) flows through the lower-right flow path (62), a ventilation opening (76) of the second lower shutter (74), and the indoor-side lower flow path (54) in that order and is supplied indoors through the air supply side outlet (14).

Referring to FIG. 15, the second operation of the humidification operating mode will be described. During the second operation, contrary to the first operation air is humidified by the second adsorption element (82) and the adsorbent of the first adsorption element (81) adsorbs water vapor.

The first upper shutter (71), the second upper shutter (72), and the switch shutter (40) are all placed in the same states as in the second operation of the humidification operating mode in the second embodiment. More specifically, the first upper shutter (71) is placed in a state that allows the outdoor-side upper flow path (51) and the upper-right flow path (61) to communicate with each other. The second upper shutter (72) is placed in a state that allows the indoor-side upper flow path (53) and the first upper-central flow path (63) to communicate with each other. In the switch shutter (40), the shutter plate (42) is moved and located at such a position as to cover a right half portion of the regenerative heat exchanger (92).

On the other hand, the first lower shutter (73) is placed in a state that allows the lower-right flow path (62) and the outdoor-side lower flow path (52) to communicate with each other. Additionally, the second lower shutter (74) is placed in a state that allows the lower-left flow path (67) and the indoor-side lower flow path (54) to communicate with each other.

In this state, indoor air taken in-as first air and outdoor air taken in as second air flow in the same way as in the second operation of the humidification operating mode in the second embodiment, in the air conditioning apparatus.

To sum up, the first air flows through the indoor-side upper flow path (53), a ventilating opening (76) of the second upper shutter (72), and the first upper-central flow path (63) in that order, flows into the humidity adjusting side passageway (85) of the first adsorption element (81), and is dehumidified there. The thus-dehumidified first air flows through the lower-right flow path (62), a ventilation opening (76) of the first lower shutter (73), and the outdoor-side lower flow path (52) in that order and is discharged outdoors through the air discharge side outlet (16).

On the other hand, the second air flows through the outdoor-side upper flow path (51), a ventilating opening (76) of the first upper shutter (71), and the upper-right flow path (61) in that order, is heated in the first adsorption element (81) and the regenerative heat exchanger (92), and thereafter flows into the humidity adjusting side passageway (85) of the second adsorption element (82). The second air humidified by the second adsorption element (82) flows through the lower-left flow path (67), a ventilation opening (76) of the second lower shutter (74), and the indoor-side lower flow path (54) in that order and is supplied indoors through the air supply side outlet (14).

Outside-Air Utilizing Cooling Operating Mode

Figure 11:
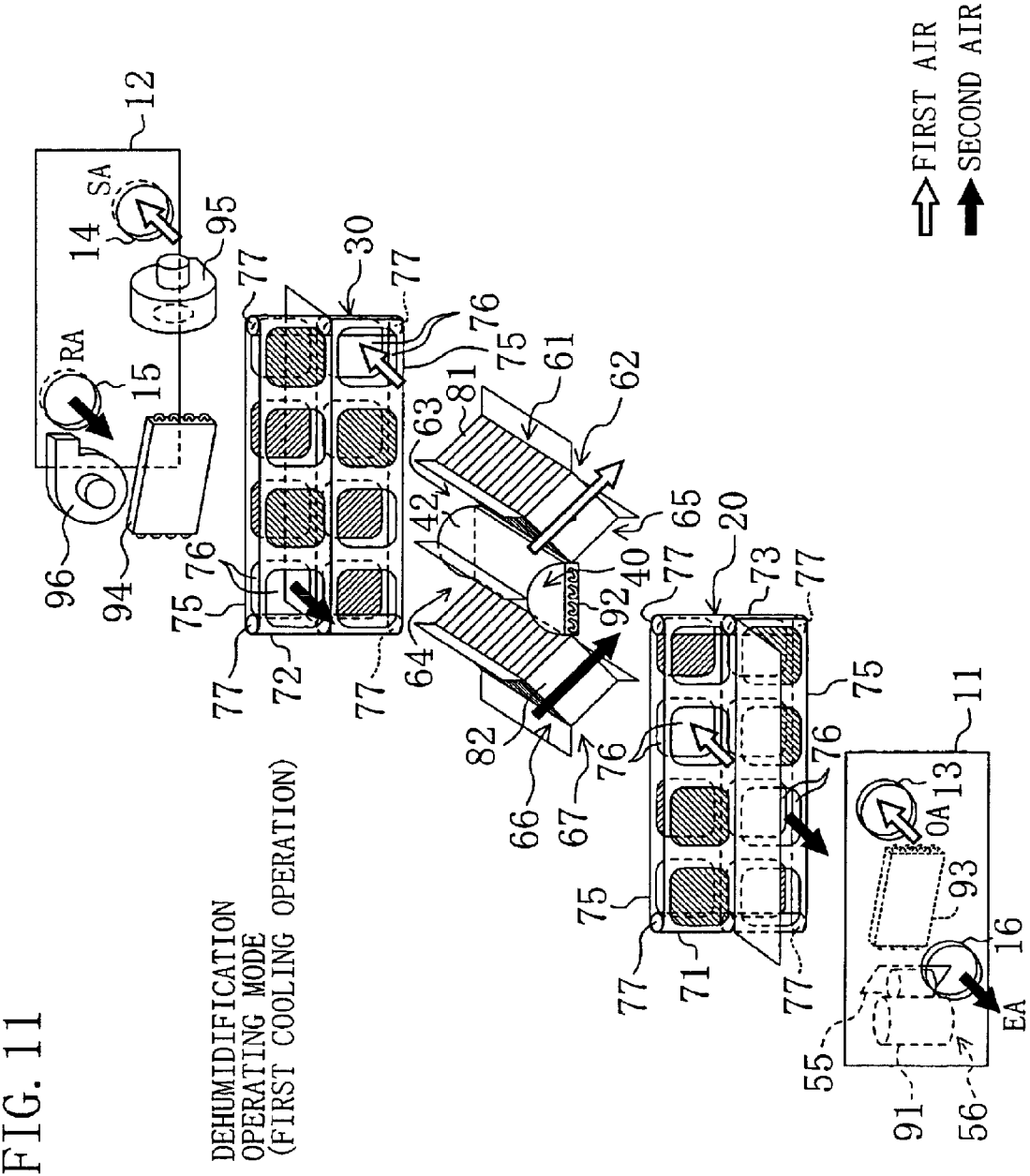
FIG. 11 is an exploded perspective view describing a first cooling operation in the dehumidification operating mode of the air conditioning apparatus according to the third embodiment.

During the outside-air utilizing cooling operating mode, air flows in exactly the same way as in the first or second cooling operation of the dehumidification operating mode in the air conditioning apparatus (see FIGS. 11 and 13).

For example, a case, in which air flows in the same way as in the first cooling operation of the dehumidification operating mode, will be described. In this outside-air utilizing cooling operating mode, the first upper shutter (71), the second lower shutter (73), the switch shutter (40), the second upper shutter (72), and the second lower shutter (74) are all placed in the same states as in the first cooling operation of the dehumidification operating mode. And, outside air taken in through the air supply side inlet (13) passes through the humidity adjusting side passageway (85) of the first adsorption element (81) and thereafter is supplied indoors through the air supply side outlet (14). On the other hand, indoor air taken in through the air discharge side inlet (15) passes through the cooling side passageway (86) of the second adsorption element (82) and thereafter is discharged outdoors through the air discharge side outlet (16).

As described above, outside air that is supplied indoors passes through the humidity adjusting side passageway (85) of the first adsorption element (81). Therefore, the outside air might be dehumidified by the first adsorption element (81) for a short period of time from the time the outside-air utilizing cooling operating mode is started. However, in the outside-air utilizing cooling operating mode the first adsorption element (81) is not regenerated and the adsorbent of the first adsorption element (81) will be saturated finally. Accordingly, after that, outdoor air is no longer dehumidified and supplied indoors as it is.

Effects of Third Embodiment

In the third embodiment, the adsorption element (81, 82) regenerated is cooled by a cooling operation and the first air to be dehumidified is introduced into the cooled adsorption element (81, 82). If first air to be dehumidified is introduced to the adsorption element (81, 82) heated to high temperature by regeneration, then the first air is heated in the humidity adjusting side passageway (85) thereof As a result, the relative humidity of the first air decreases and the amount of water vapor that the adsorption element (81, 82) adsorbs is reduced. Contrary to this, in the third embodiment the adsorption element (81, 82) is pre-cooled by a cooling operation. Thereafter, first air to be dehumidified is supplied to the pre-cooled adsorption element (81, 82). Therefore, in accordance with the third embodiment the performance of adsorption of the adsorption elements (81, 82) is sufficiently brought out, thereby making it possible to improve the performance of the air conditioning apparatus.

Other Embodiments of Invention

FIRST MODIFICATION EXAMPLE

In each of the foregoing embodiments, the shutter plate (42) of the switch shutter (40) is shaped like a curved plate. Instead, the following construction may be employed. In other words, the shutter plate (42) of the switch shutter (40) is shaped like a flat plate and the flat shutter plate (42) turns centering on its upper end, thereby changing the flow route of the second air, as shown in FIG. 16. In this case, it is however required that the side plate (41) be shaped like an angled plate.

Figure 16A:
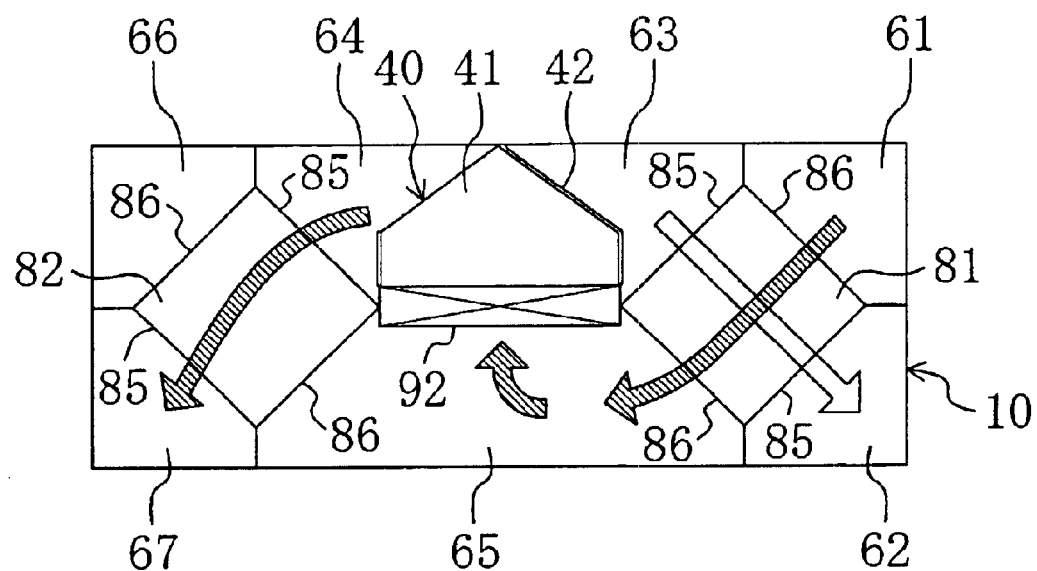
FIG. 16 is similar to FIG. 3, showing a principal part of an air conditioning apparatus according to another embodiment of the present invention (FIRST MODIFICATION EXAMPLE)
Figure 16B:
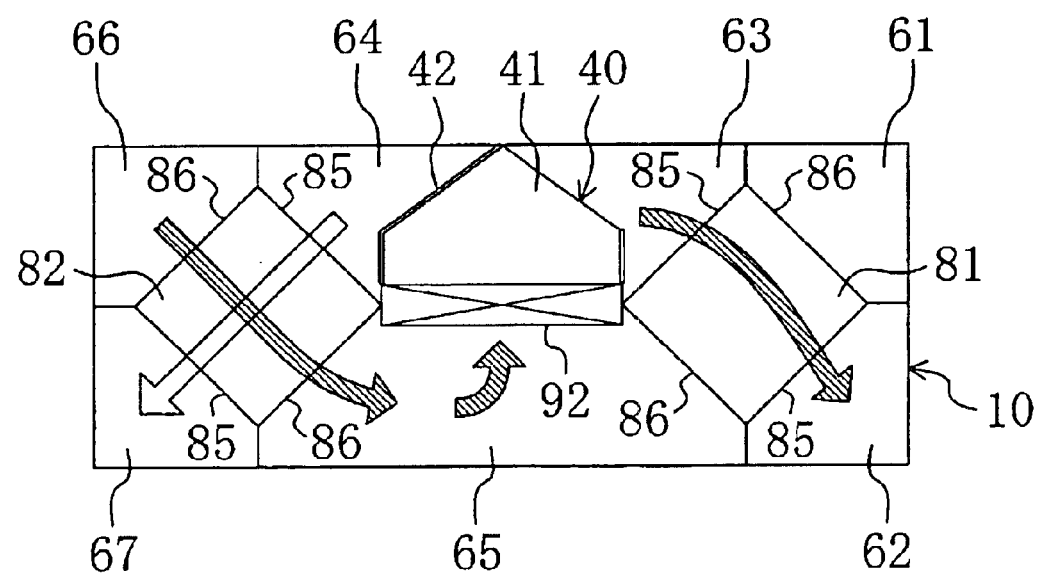

In the switch shutter (40) of the present modification example, if the shutter plate (42) is tilted toward the first adsorption element (81) (see FIG. 16(a)), this causes the lower-central flow path (65) and the second upper-central flow path (64) to come into communication with each other. Contrary to this, if the shutter plate (42) is tilted toward the second adsorption element (82) (see FIG. 16(b)), this causes the lower-central flow path (65) and the first upper-central flow path (63) to come into communication with each other.

SECOND MODIFICATION EXAMPLE

In each of the foregoing embodiments, the switch shutter (40) may be constructed as follows.

As shown in FIG. 17, the switch shutter (40) of the present modification example is provided with two slide plates (43, 44) in place of the shutter plate (42). Each of the slide plates (43, 44) is shaped like a rectangular flat plate. And, the first slide plate (43), disposed along a lower-left orienting side surface of the first adsorption element (81), is so constructed as to slide diagonally along the side surface. On the other hand, the second slide plate (44), disposed along a lower-right orienting side surface of the second adsorption element (82), is so constructed as to slide diagonally along the side surface. Additionally, in the switch shutter (40) of the present modification example the side plate (41) is shaped like a triangular plate.

Figure 17A:
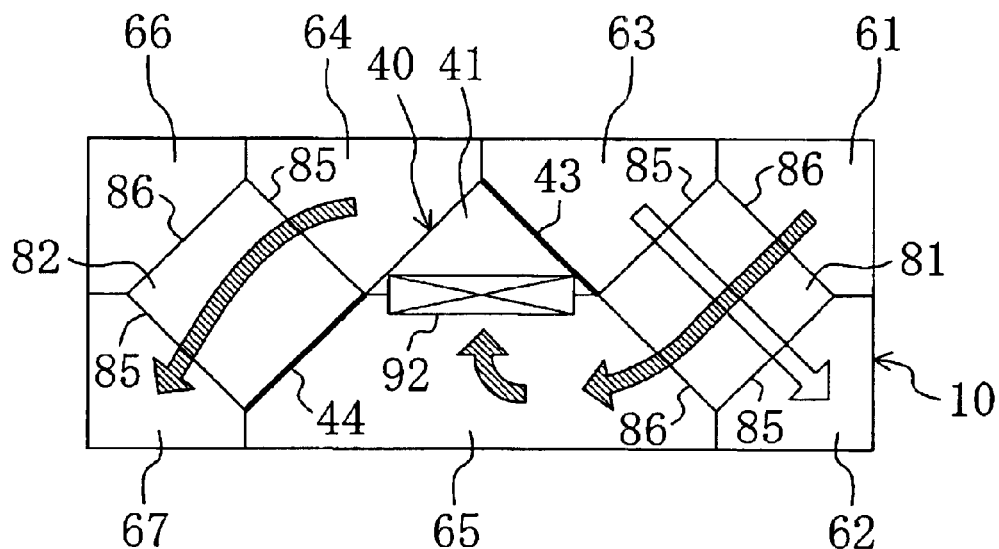
FIG. 17 is similar to FIG. 3, showing a principal part of an air conditioning apparatus according to still another embodiment of the present invention (SECOND MODIFICATION EXAMPLE)

In the switch shutter (40) of the present modification example, in a state in which the first slide plate (43) is slid upward and the second slide plate (44) is slid downward (see FIG. 17(a)), the cooling side passageway (86) of the first adsorption element (81) is brought into communication with the lower-central flow path (65), and the lower-central flow path (65) is brought into communication with the second upper-central flow path (64). Additionally, a side surface of the second adsorption element (82) is covered by the second slide plate (44) and the cooling side passageway (86) of the second adsorption element (82) is disconnected from the lower-central flow path (65). And, all the second air flowing out from the cooling side passageway (86) of the first adsorption element (81) passes through the regenerative heat exchanger (92) without flowing into the cooling side passageway (86) of the second adsorption element (82) and is introduced into the humidity adjusting side passageway (85) of the second adsorption element (82).

Figure 17B:
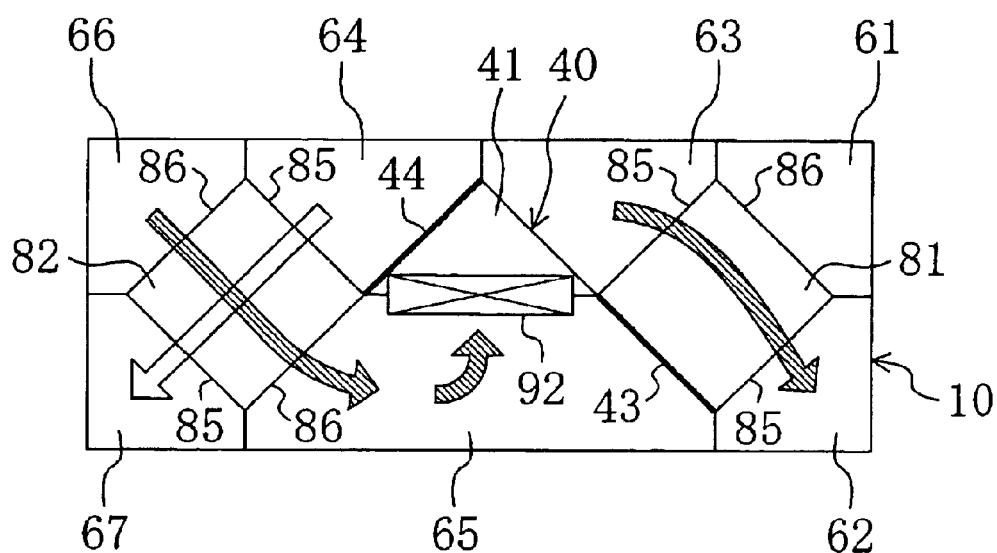

Contrary to the above state, in a state in which the first slide plate (43) is slid downward and the second slide plate (44) is slid upward (see FIG. 17(b)), the cooling side passageway (86) of the second adsorption element (82) is brought into communication with the lower-central flow path (65) and the lower-central flow path (65) is brought into communication with the first upper-central flow path (63). Additionally, a side surface of the first adsorption element (81) is covered by the first slide plate (43) and the cooling side passageway (86) of the first adsorption element (81) is disconnected from the lower-central flow path (65). And, all the second air flowing out from the cooling side passageway (86) of the second adsorption element (82) passes through the regenerative heat exchanger (92) without flowing into the cooling side passageway (86) of the first adsorption element (81) and is introduced into the humidity adjusting side passageway (85) of the first adsorption element (81).

The use of the switch shutter (40) of the present modification example prevents second air before being heated in the regenerative heat exchanger (92) from flowing into the cooling side passageway (86) of the adsorption element (81, 82) which is being regenerated. This ensures that the adsorption element (81, 82) to be generated is heated by second air from the regenerative heat exchanger (92), and that water vapor is desorbed from the adsorbent of the adsorption element (81, 82) to be generated. Therefore, the present modification example ensures regeneration of the adsorption element (81, 82), thereby making it possible to provide improvements in air conditioning apparatus performance.

THIRD MODIFICATION EXAMPLE

Each of the foregoing embodiments employs such an arrangement that the regenerative heat exchanger (92) shaped like a flat plate is disposed in alignment with the first and second adsorption elements (81, 82). Instead, the following arrangement may be employed.

Figure 18:
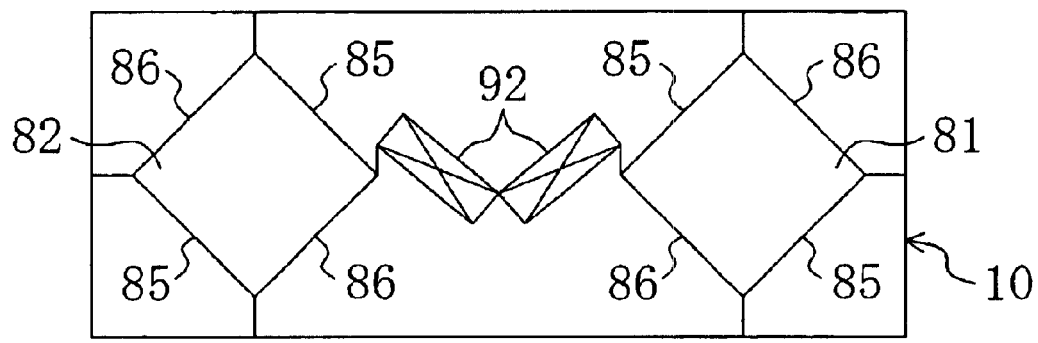
FIG. 18 is a diagram typically showing a principal part of an air conditioning apparatus according to a further embodiment of the present invention (THIRD MODIFICATION EXAMPLE)

The regenerative heat exchanger (92) may be folded, at its center relative to the right-to-left width direction, into a V-shape, as shown in FIG. 18. Alternatively, the regenerative heat exchanger (92) may be multi-folded. Such folding of the regenerative heat exchanger (92) expands the heat transfer area of the regenerative heat exchanger (92), thereby further ensuring that second air for regeneration is heated without fail. Diagrammatic representation of the switch shutter (40) is omitted in FIG. 18.

Figure 19:
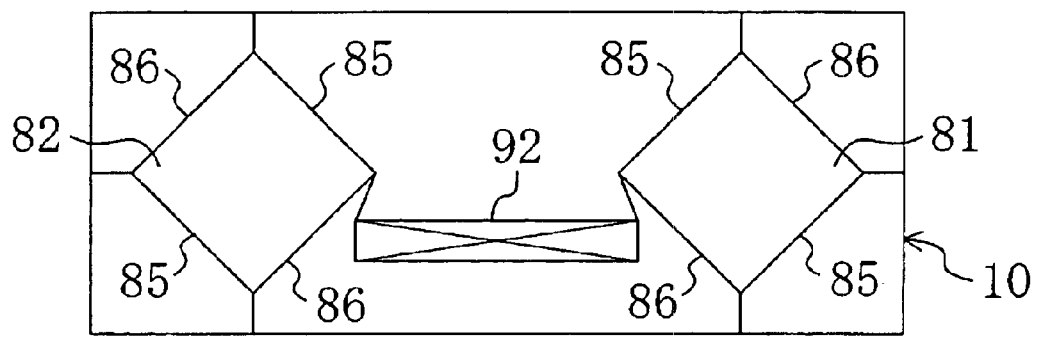
FIG. 19 is a diagram typically showing a principal part of an air conditioning apparatus according to a still further embodiment of the present invention (THIRD MODIFICATION EXAMPLE)

The regenerative heat exchanger (92) may be disposed in an offset manner, as shown in FIG. 19. More specifically, the regenerative heat exchanger (92) is so disposed as to be deviated either upward or downward of a straight line (indicated by a broken line of FIG. 19) that links together an end surface center of the first adsorption element and an end surface center of the second adsorption element (82). In this case, a left side corner of the first adsorption element (81) and a right end of the regenerative heat exchanger (92) may be overlapped. Likewise, a right side corner of the second adsorption element (82) and a left end of the regenerative heat exchanger (92) may be overlapped. Therefore, in accordance with the present modification example the air conditioning apparatus is downsized because its crosswise width is reduced. Diagrammatic representation of the switch shutter (40) is omitted in FIG. 19.

FOURTH MODIFICATION EXAMPLE

In each of the foregoing embodiments, the flat plate member (83) constituting the adsorption element (81, 82) is formed into a square shape and the adsorption element (81, 82) has a square end surface. Instead, the following arrangement may be employed.

Figure 20:
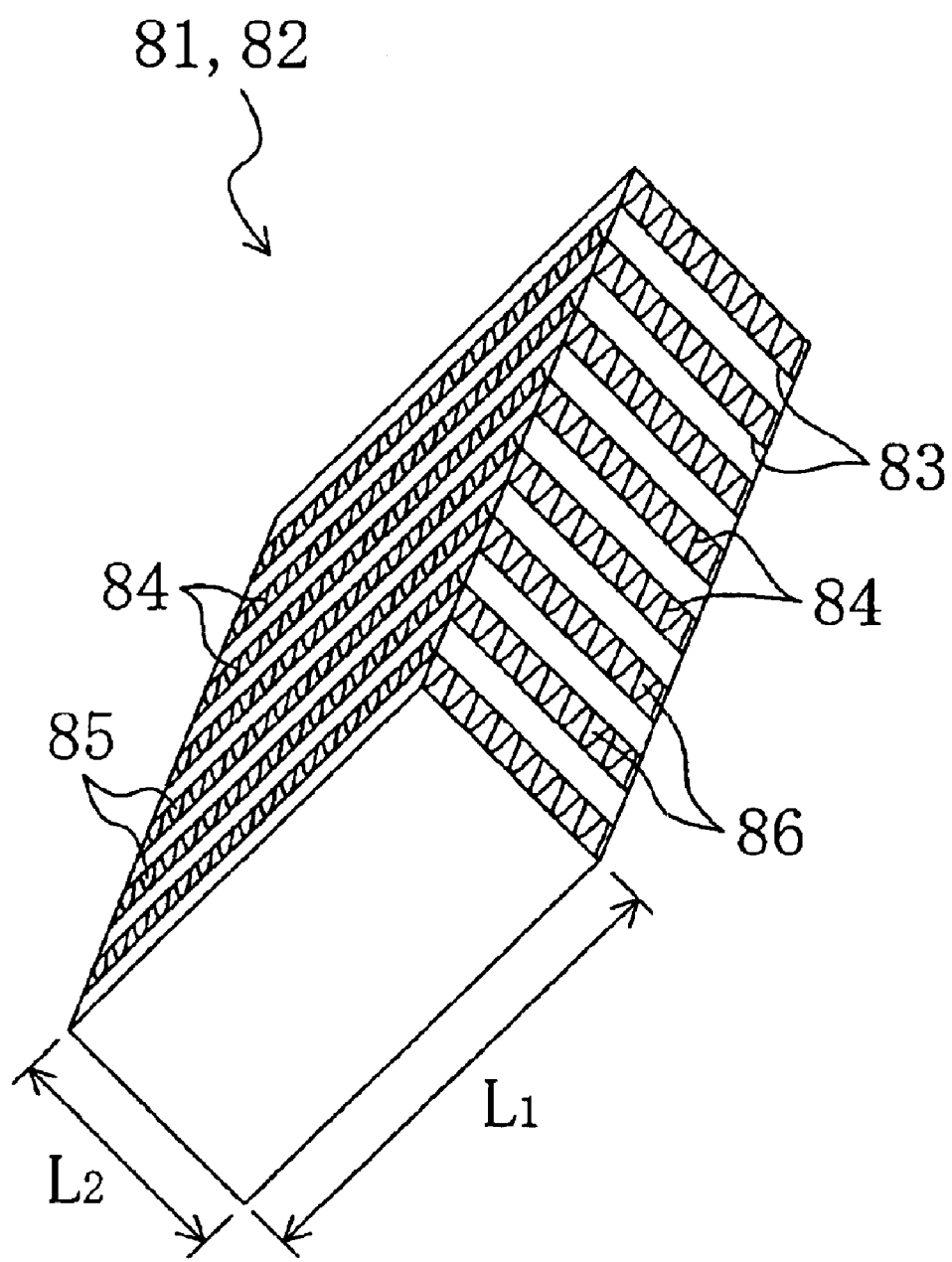
FIG. 20 is a schematic perspective view showing an adsorption element of an air conditioning apparatus according to another embodiment of the present invention (FOURTH MODIFICATION EXAMPLE)

As shown in FIG. 20, it may be arranged such that the flat plate member (83) is formed into a rectangular shape and the adsorption element (81, 82) has a rectangular end surface. In the adsorption element (81, 82), the humidity adjusting side passageway (85) opens in a side surface of the flat plate member (83) on the side of its longer side and the cooling side passageway (86) opens in a side surface of the flat plate member (83) on the side of its shorter side. Additionally, the flat plate member (83) is formed into a rectangular shape so that the length of the longer side (L1) is twice the length of the shorter side (L2). In the flat plate member (83), L1/L2=2.

Figure 21A:
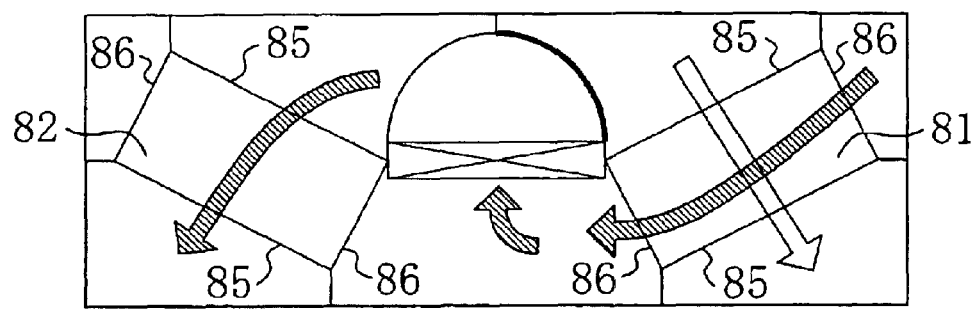
FIG. 21 is similar to FIG. 3, typically showing a principal part of an air conditioning apparatus according to still another embodiment of the present invention (FOURTH MODIFICATION EXAMPLE).
Figure 21B:
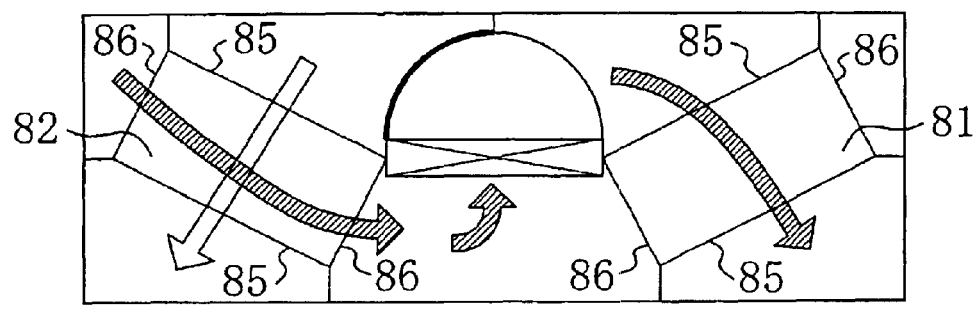

As shown in FIG. 21, the first and second adsorption elements (81, 82) of the present modification example are disposed in the same way as in the foregoing embodiments. In other words, the first adsorption element (81) is disposed in such orientation that the humidity adjusting side passageway (85) communicates with the first upper-central flow path (63) as well as with the lower-right flow path (62) and the cooling side passageway (86) communicates with the upper-right flow path (61) as well as with the lower-central flow path (65). On the other hand, the second adsorption element (82) is disposed in such orientation that the humidity adjusting side passageway (85) communicates with the second upper-central flow path (64) as well as with the lower-left flow path (67) and the cooling side passageway (86) communicates with the upper-left flow path (66) as well as with the lower-central flow path (65).

In comparison with a conventional one in which the flat plate member (83) is formed into a square shape, the adsorption element (81, 82) of the present modification example increases the flow velocity of second air in the cooling side passageway (86) by reducing the opening area of the cooling side passageway (86) and, at the same time, decreases the flow velocity of first air in the humidity adjusting side passageway (85) by expanding the opening area of the humidity adjusting side passageway (85).

It is ensured that first air is brought into contact with the adsorbent in the humidity adjusting side passageway (85) and that the flow velocity of air in the cooling side passageway (86) is increased, thereby making it possible to increase the amount of heat transferring from the first air in the humidity adjusting side passageway (85) to the second air in the cooling side passageway (86). Therefore, the present modification example secures contact between the adsorbent and the first air in the humidity adjusting side passageway (85) of the adsorption element (81, 82) and, at the same time, increases the amount of heat of adsorption that the second air in the cooling side passageway (86) absorbs, whereby the power of adsorption of the adsorption element (81, 82) is enhanced.

FIFTH MODIFICATION EXAMPLE

In each of the foregoing embodiments, both the air supply fan (95) and the air discharge fan (96) are disposed on the side of the indoor side panel (12). Instead, the following arrangements may be employed. Contrary to the foregoing embodiments, both the air supply fan (95) and the air discharge fan (96) are disposed on the side of the outdoor side panel (11), or either one of the air supply fan (95) and the air discharge fan (96) is disposed on the side of the indoor side panel (12) and the other fan is disposed on the side of the outdoor side panel (11).

SIXTH MODIFICATION EXAMPLE

In each of the foregoing embodiments, the machine room (56) which is a closed space is defined in the outdoor-side lower flow path (52) and the compressor (91) is housed in the machine room (56). Instead, the following arrangement may be employed. In other words, the compartment plate (55) partitioning the machine room (56) is omitted and the compressor (91) is disposed at a position contactable with air flowing through the outdoor-side lower flow path (52). In accordance with the present modification example, air that is discharged from the outdoor-side lower flow path (52) through the air discharge side outlet (16) is used to release exhaust heat from the compressor (91) to outside the room.

Industrial Applicability

As has been described above, the present invention is useful for air conditioning apparatus capable of air humidity adjustment.

What is claimed is:

1. An air conditioning apparatus comprising rectangular-parallelepiped-shaped adsorption elements in each of which are formed a humidity adjusting side passageway where air flowing therethrough comes into contact with an adsorbent and a cooling side passageway through which air flows to take heat of adsorption from said humidity adjusting side passageway, wherein said air conditioning apparatus performs, in alternation, a first operation in which air is dehumidified in said first adsorption element simultaneously with regeneration of said second adsorption element and a second operation in which air is dehumidified in said second adsorption element simultaneously with regeneration of said first adsorption element, and wherein said air conditioning apparatus performs at least a dehumidification operating mode in which air taken in is dehumidified and then supplied indoors, said air conditioning apparatus further comprising:

a refrigerant circuit in which a refrigerant is circulated to perform a refrigeration cycle and air for regeneration of said adsorption elements is heated by heat of condensation of said refrigerant, and flow path changing means capable of changing the flow route of air with said adsorption elements remaining fixed in position for switching between said first operation and said second operation, wherein a condenser of said refrigerant circuit is disposed between said first and second adsorption elements which are disposed side by side.

2. The air conditioning apparatus of claim 1, wherein in each said first and second adsorption element said humidity adjusting side passageway is opened in one of two adjoining side surfaces thereof and said cooling side passageway is opened in the other side surface, and wherein said first and second adsorption elements having end surfaces in which neither said humidity adjusting side passageway nor said cooling side passageway is opened are disposed in such orientation that one of end-surface diagonal lines of said first adsorption element becomes collinear with one of end-surface diagonal lines of said second adsorption element.

3. The air conditioning apparatus of claim 2, wherein said condenser of said refrigerant circuit is so disposed as to be offset from a straight line that links centers of said end surfaces of said adsorption elements.

4. The air conditioning apparatus of claim 1 further comprising:

operating mode switching means capable of changing the flow route of air with said adsorption elements remaining fixed in position for switching from a humidification operating mode in which air taken in is humidified and then supplied indoors to a dehumidification operating mode.

5. The air conditioning apparatus of claim 1 further comprising:

operating mode switching means capable of changing the flow route of air with said adsorption elements remaining fixed in position for switching from an outside air introducing operating mode in which air taken in is supplied indoors without dehumidification and humidification to a dehumidification operating mode.

6. The air conditioning apparatus of claim 1, wherein, at the time of switching between said first operation and said second operation, in advance of the start of air dehumidification by said regenerated adsorption element a cooling operation is performed in which air is forced to flow through said cooling side passageway of said adsorption element so that said adsorption elements is cooled.

7. The air conditioning apparatus of any one of claims 4–6 further comprising:

first switching mechanism, comprising a strip-like member provided with an opening portion for the passage of air and disposed in such orientation as to cross an air flow path and a pair of roller members about which said strip-like member is passed, for changing the flow route of air by rotation of said roller members causing the position of said opening portion of said strip-like member to move, and second switching mechanism for changing the flow route of air so that in said first operation air flowing out from said cooling side passageway of said first adsorption element passes through said condenser and is introduced into said humidity adjusting side passageway of said second adsorption element and in said second operation air flowing out from said cooling side passageway of said second adsorption element passes through said condenser and is introduced into said humidity adjusting side passageway of said first adsorption element, wherein said first switching mechanism and said second switching mechanism serve both as flow path changing means and operating mode switching means.

8. The air conditioning apparatus of claim 7, wherein said second switching mechanism prevents air from flowing into said cooling side passageway of said second adsorption element during said first operation and prevents air from flowing into said cooling side passageway of said first adsorption element during said second operation.

9. An air conditioning apparatus comprising:

first and second adsorption elements, each including:

a humidity adjusting side passageway in which a first air flow comes into contact with an adsorbent, and a cooling side passageway in which a second air flow absorbs heat of adsorption from the humidity adjusting side passageway; and a shutter for selectively preventing air from flowing into the cooling side passageway of one of the first and second adsorption elements;

wherein the first and second adsorption elements are configured to collectively perform one the following based on an operating state of the shutter:

a first operation in which humidity adjustment is carried out in the humidity adjusting side passageway of the first adsorption element while adsorbent is concurrently regenerated in the humidity adjusting side passageway of the second adsorption element, and a second operation in which dehumidification is carried out in the humidity adjusting side passageway of the second adsorption element while adsorbent is concurrently regenerated in the humidity adjusting side passageway of the first adsorption element.

10. The air conditioning apparatus of claim 9, further comprising a heating element, wherein:

during the first operation, the second air flow is directed through the cooling side passageway of the first adsorption element and subjected to heating by the heating element before being directed through an opening of the humidity adjusting side passageway of the second adsorption element, and during the second operation, the second air flow is directed through the cooling side passageway of the second adsorption element and subjected to heating by the heating element before being directed through an opening of the humidity adjusting side passageway of the first adsorption element.

11. The air conditioning apparatus of claim 10, wherein the shutter includes a shutter plate, the position of the shutter plate being selectively set such that:

during the first operation, the shutter plate blocks the opening of the humidity adjusting side passageway of the first adsorption element to prevent entry thereto by the heated second air flow, and during the second operation, the shutter plate blocks the opening of the humidity adjusting side passageway of the second adsorption element to prevent entry thereto by the heated second air flow.

12. The air conditioning apparatus of claim 11, wherein:

the location of the shutter plate selectively creates one of a first and second air flow path between the first and second adsorption elements, the first air flow path allows an outlet side of the cooling side passageway of the first adsorption element to communicate with the opening of the humidity adjusting side passageway of the second adsorption element, the second air flow path allows an outlet side of the cooling side passageway of the second adsorption element to communicate with the opening of the humidity adjusting side passageway of the first adsorption element, and each of the first and second air flow paths passes through the heating element.

13. The air conditioning apparatus of claim 12, wherein switching between the first and second operation occurs while the first and second adsorption elements remain fixed in place.

14. The air conditioning apparatus of claim 13, wherein after the first operation is performed, the air conditioning apparatus is configured to perform a cooling operation before performing the second operation, the cooling operation being performed by directing an air flow through the cooling side passageways of the first and second adsorption elements.

15. The air conditioning apparatus of claim 13, further comprising:

indoor inlet and outlet ports; and outdoor inlet and outlet ports;

the air conditioning apparatus being configured to selectively operate as one of a dehumidifier and humidifier, such that:

while operating as a dehumidifier, the apparatus receives the first air flow from the outdoor inlet port, and directs the first air flow out of the indoor inlet port, during the first and second operations, and while operating as a humidifier, the apparatus receives the first air flow from the indoor inlet port, and directs the first air flow out of the outdoor outlet port, during the first and second operations.

16. The air conditioning apparatus of claim 12, wherein the heating element is a condenser, which is part of a refrigerant circuit for performing a refrigerant cycle.

17. The air conditioning apparatus of claim 11, wherein the first and second adsorption elements are configured as two rectangular-parallelepiped-shaped elements, wherein the first and second adsorption elements are oriented within the apparatus, such that two corners of a cross-section of the first adsorption element are collinear with two corners of a cross-section of the second adsorption element, for each of the first and second adsorption elements, the opening of the humidity adjusting side passageway and the outlet of the cooling side passageway are disposed in adjoining first and second side surfaces of the adsorption element, respectively, and the heating element is disposed between the cross-sectional corner adjoining the first and second side surfaces of the first adsorption element and the cross-sectional corner adjoining the first and second side surfaces of the second adsorption element.

* * * * *